United States Patent
Qian et al.

(10) Patent No.: US 10,128,995 B2
(45) Date of Patent: Nov. 13, 2018

(54) FILTER BANK MULTICARRIER MODULATION-BASED SIGNAL TRANSMITTING METHOD, SIGNAL RECEIVING METHOD AND DEVICE

(71) Applicant: Samsung Electronics Co., Ltd, Gyeonggi-do (KR)

(72) Inventors: Chen Qian, Beijing (CN); Pengfei Sun, Beijing (CN); Bin Yu, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 15/236,383

(22) Filed: Aug. 12, 2016

(65) Prior Publication Data
US 2017/0054539 A1 Feb. 23, 2017

(30) Foreign Application Priority Data

Aug. 21, 2015 (CN) .......................... 2015 1 0520043
Nov. 27, 2015 (CN) .......................... 2015 1 0848630

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0007* (2013.01); *H04L 27/2634* (2013.01)

(58) Field of Classification Search
CPC .. H04L 5/0048; H04L 5/0007; H04L 27/2634
See application file for complete search history.

(56) References Cited

U.S. PATENT DOCUMENTS

2008/0019305 A1* 1/2008 Dekorsy ........... H04W 72/0453
370/329
2009/0122853 A1* 5/2009 Lopez de Victoria .....................
H04L 25/0248
375/232
(Continued)

FOREIGN PATENT DOCUMENTS

CN 103825862 5/2014
EP 2819478 A1 12/2014
(Continued)

OTHER PUBLICATIONS

The International Searching Authority, "International Search Report," International Application No. PCT /KR2016/008779, Nov. 16, 2016, 3 pages, publisher the ISA/KR, International Application Division, Korean Intellectual Property Office, Daejeon, Republic of Korea.
(Continued)

*Primary Examiner* — Shailendra Kumar

(57) ABSTRACT

A Filter Bank Multicarrier (FBMC) modulation-based signal transmitting method includes mapping, by a transmitter, an original Data Block (DB) with at least one symbol to a first Resource Block (RB), preprocessing the original DB, and mapping the preprocessed original DB to a second RB, modulating, by the transmitter, data of the first RB and the second RB by using a FBMC modulation, and, transmitting, by the transmitter, the data modulated. A transmitter, comprising a mapping module, a modulating module and a transmitting module, wherein the mapping module is to map an original DB with at least one symbol to a first resource block (RB), preprocess the original DB, and map the preprocessed original DB to a second RB, the modulating module is to modulate data of the first RB and the second
(Continued)

RB, by using FBMC modulation, and, the transmitting module is to transmit the data modulated.

20 Claims, 19 Drawing Sheets

(51) Int. Cl.
    *H04W 72/04* (2009.01)
    *H04L 29/08* (2006.01)

(56) References Cited

U.S. PATENT DOCUMENTS

| | | | |
|---|---|---|---|
| 2009/0196249 A1* | 8/2009 | Kawamura | H04B 1/7143 370/330 |
| 2009/0213948 A1* | 8/2009 | Ma | H04L 25/0226 375/260 |
| 2010/0246498 A1* | 9/2010 | Lim | H04L 5/0007 370/329 |
| 2011/0164526 A1* | 7/2011 | Zhu | H04L 5/0023 370/252 |
| 2014/0056220 A1* | 2/2014 | Poitau | H04W 40/246 370/328 |
| 2014/0233437 A1* | 8/2014 | Abdoli | H04L 5/0007 370/280 |
| 2014/0286384 A1* | 9/2014 | Mestre Pons | H04L 27/01 375/232 |
| 2015/0304146 A1* | 10/2015 | Yang | H04L 5/0066 370/329 |
| 2017/0332376 A1* | 11/2017 | He | H04L 5/0001 |

FOREIGN PATENT DOCUMENTS

| | | |
|---|---|---|
| WO | 2014-085710 A1 | 6/2014 |
| WO | 2016/156580 A1 | 10/2016 |

OTHER PUBLICATIONS

Supplementary European Search Report dated Aug. 6, 2018 in connection with European Patent Application No. 16 83 9474.

\* cited by examiner

FILTER BANK MULTICARRIER MODULATION-BASED SIGNAL TRANSMITTING METHOD, SIGNAL RECEIVING METHOD AND DEVICE

CROSS-REFERENCE TO RELATED APPLICATION(S) AND CLAIM OF PRIORITY

The present application is related to and claims the benefit under 35 U.S.C. § 119(a) of a Chinese patent application filed on Aug. 21, 2015 in the State Intellectual Property Office of the People's Republic of China (P.R.C) and assigned Application Number 201510520043.7, and a Chinese patent application filed on Nov. 27, 2015 in the State Intellectual Property Office of the P.R.C and assigned Application Number 201510848630.9, the entire disclosures of which are hereby incorporated by reference.

TECHNICAL FIELD

The present disclosure relates to wireless communication technologies, and more particularly, to a Filter Bank Multicarrier (FBMC) modulation-based signal transmitting method, signal receiving method and device.

BACKGROUND

With rapid development of information industry, unprecedented challenges have been brought to future mobile communication technologies by increasing requirements of mobile Internet and internet of things (IoT). For example, based on a report of International Telecommunications Union (ITU), e.g., ITU-R M.[IMT.BEYOND 2020.TRAFFIC], it is expected that by 2020, growth of mobile services will be nearly 1000 times compared with mobile services in 2010 (4G era). Number of connected user equipment (UE) may exceed 17 billion. Number of connected devices may be even more amazing, when vast amounts of IoT devices gradually penetrate to mobile communication network. In response to the unprecedented challenges, broad research on the fifth mobile communication technologies (5G) have already been conducted by communication industry and academic community, to face with 2020. In the report ITU-R M.[IMT.VISION] of the ITU, framework and overall objectives of future 5G have been discussed. Such report also provides detailed descriptions about demand outlook, application scenarios and various important performance indexes of 5G. For new demands in the 5G, the report ITU-R M.[IMT.FUTURE TECHNOLOGY TRENDS] of the ITU provides relevant information about tendency of the 5G technologies, which aims to solve the following significant problems, such as support IoT, time delay, energy efficiency, cost, network flexibility, emerging service support and flexible spectrum utilization, by using significant improvement of system throughput, user experience consistency and extensibility.

Modulation waveform and multi-access mode are important bases of Air-interface of wireless communication, and 5G is no exception. At present, a typical example, Orthogonal Frequency Division Multiplexing (OFDM) of Multi-Carrier Modulation (MCM) technical family has been widely used in broadcast audio and video field, as well as civil communication systems, e.g., Long Term Evolution (LTE) system, which corresponds to Evolved Universal Terrestrial Radio Access (E-UTRA) established by 3rd Generation Partnership Project (3GPP), European Digital Video Broadcasting (DVB) and Digital Audio Broadcasting (DAB), Very-high-bit-rate Digital Subscriber Loop (VDSL), IEEE802.11a/g Wireless Local Area (WLAN), IEEE802.22 Wireless Regional Area Network (WRAN) and IEEE802.16 World Interoperability for Microwave Access (WiMAX), and so on. Basic idea of the OFDM technologies is to divide a broadband channel into multiple parallel narrow band sub-channels/sub-carriers, to enable high-speed data stream transmitted in a frequency selective channel to be converted into low-speed data stream, which is transmitted in multiple parallel independent and flat sub-channels. Thus, system capability for resisting multipath interference may be greatly improved. And the OFDM may utilize Inverse Fast Fourier Transform (IFFT)/Fast Fourier Transformation (FFT) to implement simplified modulation and demodulation modes. Secondly, by adding a Cyclic Prefix (CP), linear convolution with the channel may be converted into circular convolution. Subsequently, based on properties of the circular convolution, when a CP length is greater than a channel maximum multipath delay reception without Inter-symbol Interference (ISI) may be implemented by using a simple single-lap frequency domain equalization, so as to reduce processing complexity of receiver. Although Mobile Broadband (MBB) service requirements of 4G era may be well supported by CP-OFDM modulation waveform, there may be great limitations or deficiencies for the CP-OFDM in 5G scenarios as follows, due to the fact that 5G may be faced with more challenging and more rich scenarios.

(1) In a low delay transmission scene of 5G, when adding the CP to resist the ISI, spectrum utilization may be greatly reduced for the following reasons. Symbol length of the OFDM may be greatly shortened by low-delay transmission, while a CP length is only limited by impact response of channel. Subsequently, a ratio of CP length to OFDM symbol length may be greatly increased. Such overhead may lead to huge spectral efficiency loss, which is difficult to be accepted.

(2) In the IoT scene of 5G, a larger signaling overhead needed by closed-loop synchronous maintenance may be resulted from strict time synchronization requirements. Besides, there may be no flexibility in data frame structure, when a strict synchronous mechanism is employed. Subsequently, different synchronization requirements of various services may not be well supported.

(3) The OFDM employs Rectangular Pulse, which enables frequency domain side lobe of the OFDM to roll down very slowly, and causes a great deal of out-of-band leakage. Thus, the OFDM is very sensitive to Carrier Frequency Offset (CFO). However, 5G may have a lot of requirements for fragmentation spectrum to flexibly access, or to be shared. Flexibility of spectrum access may be greatly limited by high out-of-band leakage of the OFDM. Alternatively, in other words, a large frequency domain protection band is needed. Thus, spectrum utilization may be reduced.

The foregoing deficiencies are resulted from intrinsic characteristics of the OFDM. Although impacts resulted from these deficiencies may be reduced by taking some measures, meanwhile, the complexity of system design may be increased, which could not solve problems fundamentally.

For the foregoing reasons, as described in report ITU-R M.[IMT.FUTURE TECHNOLOGY TRENDS] of the ITU, some new waveform modulation technologies (based on multicarrier modulation) have been considered by the 5G. Filter Bank Multicarrier (FBMC) modulation technologies become one of hot research subjects. Since degree of freedom of Prototype Filter design has been provided, a filter with better Time/Frequency Localization (TFL) characteristics may be employed to perform pulse shaping to transmission waveform, to enable transmission signals to display various better characteristics, e.g., CP is not needed to resist the ISI and spectral efficiency may be improved, flexible fragmentation spectrum access may be well supported by lower out-of-band leakage, and characteristics not sensitive to CFO. To achieve maximum spectral efficiency, a typical FBMC system may generally employ Offset Quadrature Amplitude Modulation (OQAM) technologies. Thus, the foregoing technologies are generally referred to as FBMC/OQAM system, which may also be referred to as OFDM/OQAM system. An early literature "Analysis and design of QFDM/QQAM systems based on filter bank theory", IEEE Transactions on Signal Processing, Vol. 50, No. 5, 2002 may be simply referred to, when wondering how the FBMC may be applied to digital communication.

The FBMC has gotten attention in 5G research, due to better characteristics thereof not possessed by the OFDM. There are many challenges to be faced with, when the FBMC is used in applications of wireless communication system, due to some intrinsic deficiencies of the FBMC. These challenges needing to be urgently solved are continuously studied. One problem therein is intrinsic interference problem of the FBMC/OQAM system. To use prototype filter with better TFL characteristics. Inter-carrier Interference (ICI) may generally exist between adjacent sub-carriers of the FBMC system. Meanwhile, ISI may be resulted from long tail in time-domain. Intrinsic interference problems of the FBMC system may be resulted from simultaneous presence of ICI and ISI. The FBMC/OQAM has introduced adjacent carriers and real-number-field orthogonality between symbols, by respectively modulating real number symbols on real/imaginary part of adjacent subcarriers, and transmitting alternately in time. Subsequently, ICI and ISI may be eliminated perfectly in a scene without fading. However, the real-number-field orthogonality may be destroyed by fading channel. Subsequently, information transmitted on subcarrier and symbol may be leaked to adjacent subcarriers and symbols. The foregoing interference may not be reduced, accompanying with increasing Signal-Noise Ratio (SNR), which may lead to degraded system error performance. In a scene with higher SNR, system is in an interference limited environment, and error performance may be mainly determined by interference. Thus, the ICI and ISI may lead to an error floor with higher SNR. In a high-speed mobility environment (such as a high-speed train with a strong time selective environment), or a strong frequency selective environment, higher error floor resulted from intrinsic interference of the FBMC/OQAM system may be even worse, which may also have great impact on system link reliability. Since interference is relevant to all the adjacent subcarriers, elimination operations may be relatively complicated, when only eliminating interference at the receiver. Although the foregoing problem may be effectively dealt with by using a method, such as Successive Interference Cancellation (SIC), implementation complexity thereof may be relatively higher, which may also lead to longer delay. Besides, there are higher requirements for the receiver to learn accurate channel state information.

In view of above, to improve competitiveness of the FBMC in the 5G candidate technologies, in addition to developing advantageous features of the FBMC, deficiencies thereof are also needed to be solved. Regarding various scenarios in 5G, particularly data communication in high-speed mobility environment and stronger frequency selective environment, it is necessary to solve problem of high error floor resulted from intrinsic interference of the FBMC system by using an effective method, so as to improve reliability of system links.

SUMMARY

The technical problems aimed to be solved by the present disclosure are link reliability problem resulted from ISI and ICI, which is caused by intrinsic interference in the FBMC system on a fading channel. At present, there is no effective method to reduce impacts on system, which may be resulted from intrinsic interference on fading channels.

To address the above-discussed deficiencies, it is a primary object to provide a FBMC modulation-based signal transmitting method, signal receiving method and device, so as to reduce ISI and ICI resulted from intrinsic interference on fading channels, improve capabilities of the FBMC/OQAM system resisting fading channels, and effectively enhance link reliability.

The present disclosure provides a FBMC modulation-based signal transmitting method, including mapping, by a transmitter, an original Data Block (DB) with at least one symbol to a first Resource Block (RB), preprocessing the original DB, and mapping the preprocessed original DB to a second RB, modulating, by the transmitter, data of the first RB and the second RB, by using a FBMC modulation, and transmitting, by the transmitter, the data modulated.

Preferably, the method further includes allocating, by the transmitter, same time resources for the first RB and the second RB, and allocating non-overlapped frequency resources with equal number for the first RB and the second RB, or, allocating, by the transmitter, same frequency resources for the first RB and the second RB, and allocating non-overlapped time resources with equal number for the first RB and the second RB.

Preferably, the method further includes at least one of dynamically selecting, by the transmitter, a resource allocation mode for allocating the time frequency resources to the first RB and the second RB, based on channel state information fed back by a receiver, and indicating the resource allocation mode to the receiver hi a downlink control channel or a downlink shared channel; wherein indicating the resource allocation mode to the receiver comprises: transmitting an index of the resource allocation mode in the downlink control channel or the downlink shared channel, so as to facilitate the receiver to obtain the corresponding resource allocation mode after searching in a look-up table with the index of the resource allocation mode: or, dynamically adjusting, by the transmitter, a size of the original DB and a mapping order of preprocessed DBs, based on the channel state information fed back by the receiver, and informing the receiver the size of the DB to be processed currently and the mapping order by using the downlink control channel or the downlink shared channel, wherein informing the receiver the size of the DB to be processed currently and the mapping order by using the downlink control channel or the downlink shared channel comprises: transmitting a DB size indicator and a mapping order indicator, so as to facilitate the receiver to obtain the corresponding DB size and the mapping order of preprocessed DBs, after searching the look-up table with the DB size indicator and the mapping order indicator; or, receiving from the receiver, by the transmitter, the index of the resource allocation mode, a DB size index and a mapping order index, which are determined by the receiver based on a channel estimation result, determining the corresponding resource allocation mode, the DB size and the mapping order by searching the look-up table, wherein searching the look-up table comprises: the resource allocation mode, the DB size and the mapping order respectively corresponding to the look-up table, and respectively possessing a corresponding index; or, the resource allocation mode, the DB size and the mapping order corresponding to one look-up table.

Preferably, the method further includes when channel time selective index value meets a set first condition, selecting, by the transmitter, to allocate the time frequency resources in a frequency domain; when channel frequency selective index value meets a set second condition, selecting, by the transmitter, to allocate the time frequency resources in a time domain; and, when the channel time selective index value meets the set first condition, and the channel frequency selective index value meets the set second condition, selecting, by the transmitter, to allocate the time frequency resources in the frequency domain.

Preferably, preprocessing the original DB and mapping the preprocessed original DB to the second RB include: mapping the preprocessed DB to the second RB in sequence; or, mapping the preprocessed DB to the second RB in a reverse sequence; preprocessing the original DB includes; performing a conjugate to each symbol in the original DB; or, performing the conjugate to each symbol in the original DB, and taking an opposite number of a symbol of an even subcarrier or an odd subcarrier; or, taking an opposite number of a symbol of an even subcarrier, or an odd subcarrier in the original DB, and performing the conjugate to each symbol; or, taking an opposite number of a symbol of an even subcarrier, or an odd subcarrier in the original DB; or, taking an opposite number of a symbol of an even, or odd Offset Quadrature Amplitude Modulation (OQAM) symbol in the original DB.

Preferably, dynamically adjusting the size of the original DB includes: classifying channel change speeds into different groups, wherein each group corresponds to a size of an original DB; obtaining the DB size by using a corresponding index, based on a channel change speed; wherein dynamically adjusting the mapping order of the preprocessed DBs includes: when the channel change speed is greater than a set first threshold, preprocessing the DBs based on the mapping order; when the channel change speed is less than a set second threshold, preprocessing the DBs based on an inverted mapping order; wherein the channel change speed comprises a frequency domain change speed and a time change speed, the frequency domain change speed is measured by a channel frequency selective index, the time change speed is measured by a channel time selective index, the channel frequency domain selective index and the channel time selective index are determined by the receiver based on the channel estimation result.

Preferably, dynamically adjusting the size of the original DB includes: adjusting the size of the original DB based on a size of a data symbol block to be transmitted, such that the size of the data symbol block to be transmitted is an integer multiple of the size of the original DB.

Preferably, determining the resource allocation mode, the DB size and the mapping order comprises: determining the resource allocation mode based on channel time selective fading and channel frequency selective fading; when selecting to allocate time frequency resources in a frequency domain, determining the DB size and the mapping order based on die channel frequency selective fading; when selecting to allocate the time frequency resources in a time domain, determining the DB size and the mapping order based on the channel time selective fading.

The present disclosure also provides a transmitter, including a mapping module, a modulating module and a transmitting module, wherein the mapping module is to map an original DB with at least one symbol to a first RB, preprocess the original DB, and map the preprocessed original DB to a second RB; the modulating module is to modulate data of the first RB and the second RB, by using a FBMC modulation; and, the transmitting module is to transmit the data modulated.

The present disclosure also provides a FBMC modulation-based signal receiving method, including: receiving, by a receiver, a DB; demodulating, by the receiver, the DB received, by using a FBMC modulation mode; equalizing, by the receiver, each demodulated symbol; and performing, by the receiver, a postprocessing to the DB equalized, based on a set DB size. Preferably, the postprocessing includes performing a combination process to a received symbol of the first RB and a corresponding received symbol of the second RB, wherein the first RB and the second RB are resources in a group of time frequency resources.

Preferably, the combination process includes performing an arithmetic average to a symbol in the first RB and another symbol in a corresponding position of the second RB; or, the combination process includes performing an arithmetic average to a symbol in the first RB and an opposite number of another symbol in a corresponding position of the second RB.

Preferably, the combination process includes swapping a real part and an imaginary part of a received symbol in the second RB, and performing an arithmetic average to a symbol in the first RB and another symbol in a corresponding position of the second RB; or, the combination process includes swapping the real part and the imaginary part of the received symbol in the second RB, and performing the arithmetic average to the symbol in the first RB and an opposite number of another symbol in the corresponding position of the second RB.

Preferably, the method further includes determining, by the receiver, the channel frequency selective index and the channel time selective index based on the channel estimation result, and feeding back the channel frequency selective index and the channel time selective index to the transmitter; and or, determining, by the receiver, the resource allocation mode, the DB size and the mapping order based on the channel estimation result, and feeding back a respective index of the resource allocation mode, the DB size and the mapping order to the transmitter.

The present disclosure also provides a receiver, including a receiving module, a demodulating module, an equalizing module and a postprocessing module, wherein the receiving module is to receive a DB; the demodulating module is to demodulate the DB received, by using a FBMC demodulation mode; the equalizing module is to equalize each demodulated symbol; and, the postprocessing module is to perform a postprocessing to an equalized DB, based on a set DB size.

Based on the foregoing technical solutions, it can be seen that the FBMC modulation-based signal transmitting method, signal receiving method and device, which are provided by the present disclosure, may reduce ISI and ICI resulted from intrinsic interference on fading channels. Subsequently, capabilities of the FBMC/OQAM system resisting fading channels may be improved, and link reliability may also be effectively enhanced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of tire present disclosure and its advantages, reference is now made to the following description taken in conjunction with the accompanying drawings, in which like reference numerals represent like parts.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

To make objectives, technical solutions and advantages of the present disclosure more clear, detailed descriptions about the present disclosure will be provided in the following, accompanying with attached figures and embodiments.

Signal waveform with better TFL characteristics may be obtained, by using FBMC-based modulation mode, e.g., prototype filter functions, such as Isotropic Orthogonal Transform Algorithm (IOTA), Extended Gaussian Function (EGF), and European PHYDYAS. The FBMC can employ a prototype filter with better TFL characteristics to perform pulse shaping to signals of each subcarrier. Subsequently, 1) the FBMC can greatly resist ISI brought by multipath without CP, higher spectral efficiency and energy efficiency can be brought compared with OFDM, and well reception reliability can be obtained under greater time error, so as to allow non-strict synchronous transmission; 2) the FBMC can transmit signals by using extremely narrow frequency resources, due to better TFL characteristics, and maintain relatively lower out-of-band leakage, so as to well resist ICI resulted from Doppler or phase noise. Thus, the FBMC possesses great potential in the following scenes, such as wireless cognition, fragmentation band access and asynchronous transmission.

Figure 1:
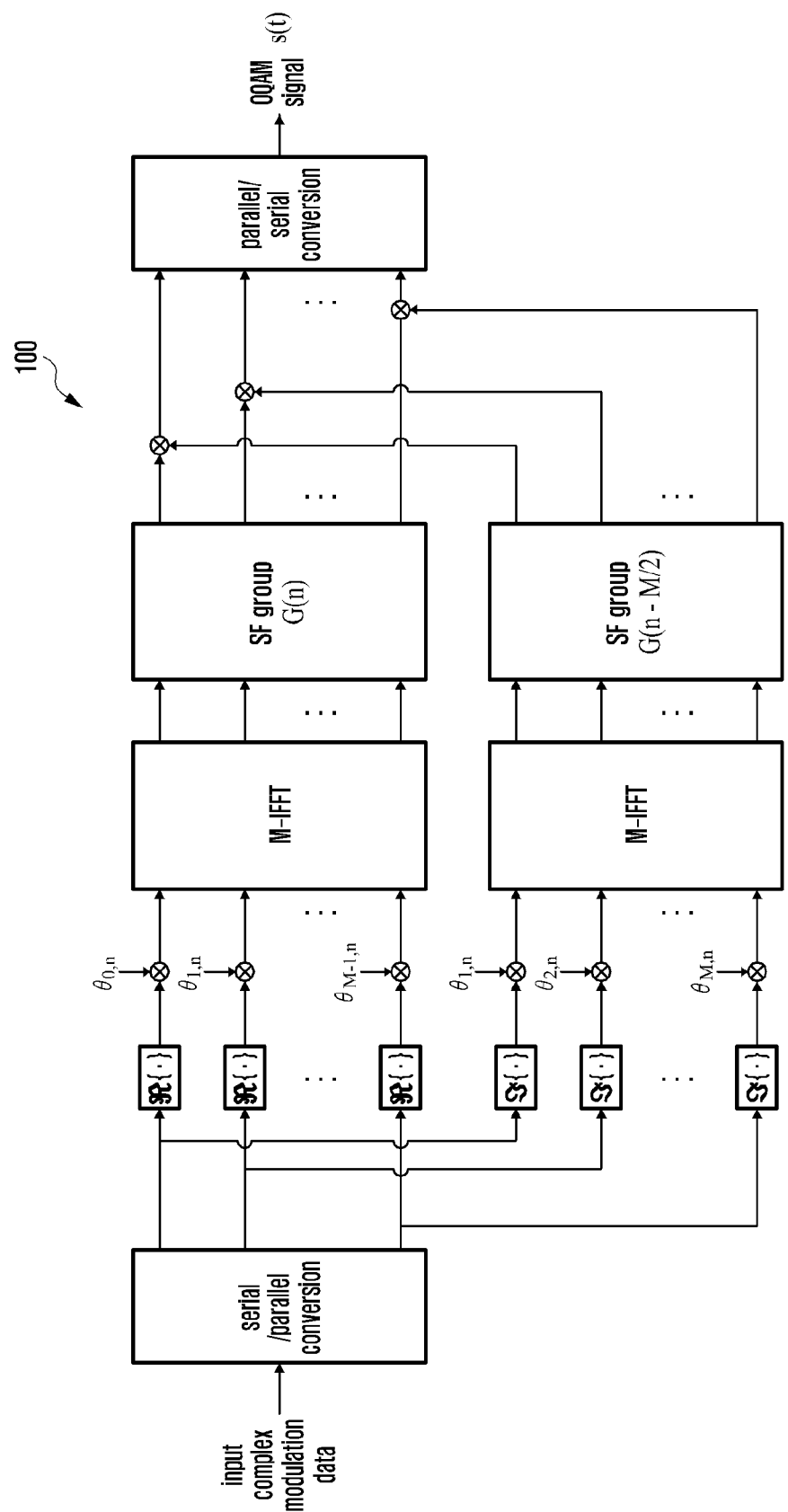
FIG. 1 is a schematic diagram illustrating how to generate a FBMC/OQAM signal.

To obtain the highest FBMC spectral efficiency, OQAM technologies are necessary to be used, which is referred to as FBMC/OQAM, or QFDM/OQAM. Both FBMC/OQAM and OFDM/OQAM are referred to as OQAM in the following text of the present disclosure. In the OQAM, a Quadrature Amplitude Modulation (QAM) signal is divided into two signals, which is alternately modulated into real or imaginary part of one carrier and transmitted with a time-alternatively method. At the receiver, when there is no channel impact, the transmitted signal can be restored by alternately extracting real part, or imaginary part of each subcarrier's signal. FIG. 1 is a schematic diagram illustrating to generate a FBMC/OQAM signal. Functions of each module can be easily understood based on subsequent OQAM signal formula expressions. Baseband equivalents of continuous-time multicarrier FBMC/OQAM signal can be expressed by using the following formula (1).

$$s(t) = \sum_{n \in \mathcal{Z}} \sum_{m=0}^{M-1} a_{m,n} \underbrace{j^{m+n} e^{j2\pi m v_0 t} g(t - n\tau_0)}_{g_{m,n}(t)} \quad (1)$$

In the foregoing formula, $(\cdot)_{m,n}$ can represent a frequency-time point. $a_{m,n}$ is generated from a real-number modulation signal transmitted on $m^{th}$ subcarrier of the $n^{th}$ symbol that is, a Pulse Amplitude Modulation (PAM) symbol. $a_{m,n}$ represents a real part value, or an imaginary part value of a complex QAM symbol $c_{m,n}$, symbol period thereof is $\tau=2\tau_0$. For example, $$a_{m,n} = \begin{cases} \Re\{c_{m,n}\} & n \text{ is even} \\ \ldots & \\ \Im\{c_{m,n}\} & n \text{ is odd} \end{cases},$$

$\Re\{\cdot\}$ and $\Im\{\cdot\}$ respectively represent to take the real part and take the imaginary part.

j represents an imaginary unit, and $j^{m+n}$ represents that real part and imaginary part alternate. M is an even number, which represents number of subcarriers. Set $\mathcal{Z}$ represents a set of transmitted symbols. $v_0$ represents an interval between subcarriers. $\tau_0$ represents a symbol period of the OQAM, $\tau_0=\tau/2=1/(2v_0)$. g is a prototype filter function, time-domain impulse response length thereof is K times of $\tau$. Subsequently, time-domain waveforms of adjacent (2K−1) symbols is partially overlapped. Thus, K is generally referred to as filter overlapping factor. $g_{m,n}(t)$ represents an equivalent synthesis filter function for modulating $a_{m,n}$.

It can be seen that, OQAM symbol rate is 2 times of symbol rate of traditional OFDM. Besides, CP may be not added to the OQAM. Since OQAM modulation is real number, information taken by each OQAM symbol is half of that of traditional OFDM. That is, signal transmission rate of one OQAM system is the same as that of an OFDM system without CP.

OQAM real-domain orthogonality is implemented by designing a prototype filter function. Inner product of transmitter synthesis filter function and receiver analysis filter function should meet, or approximately meet formula (2) that is, the prototype filter should meet the following requirements.

$$\Re\underbrace{\{\langle g_{m,n} \mid g_{m',n'} \rangle\}}_{\langle g \rangle_{m,n}^{m',n'}} = \Re\left\{\int g_{m,n}(t) \cdot g^*_{m',n'}(t)dt\right\} = \delta_{m,m'} \delta_{n,n'} \quad (2)$$

In the foregoing formula, $(\cdot)$ represents a complex conjugate. $\Re\{\cdot\}$ represents an operation of taking real part. $\langle \cdot | \cdot \rangle$ represents an inter product. When m=m' and n=n', $\delta_{m,m'}=1$ and $\delta_{n,n'}=1$; otherwise, the latter two values are 1. That is, when m≠m' or n≠n', the inter product is a pure imaginary item. To facilitate descriptions, the inner product is represented by $\langle g \rangle_{m,n}^{m',n'}$. It is obvious that pure imaginary part interference is resulted from signals between different sub-carriers and different symbols. And then, when signal $s(t)_{modulated\ by}$ FBMC/OQAM passes a distortion-tree channel, the originally transmitted real-number signal $a_{m,n}$ is obtained through Perfect Reconstruction (PR), after performing a simple operation to a received signal based on formula (3), by using a receiving Analysis Filter (AF) $g_{m,n}^*(t)$ matching with transmitting Synthesis Filter (SF) $g_{m,n}(t)$. $\eta_{m,n}$ formula (3) represents a noise item. And the originally transmitted data is demodulated, after synthesizing complex QAM signal $c_{m,n}$.

$$\hat{a}_{m,n} = \Re\{y_{m,n}\} = \Re\{\langle (s(t)+n(t)+n(t))|g_{m,n}\rangle\} = a_{m,n} + \eta_{m,n}, m=0, \ldots, M-1, n \in \mathcal{Z} \quad (3)$$

$y_{m,n}$ represents the signal received on the $m^{th}$ subcarrier of the $n^{th}$ symbol.

However, in an actual transmission environment, large-scale fading resulted from path loss and shadow fading, and small-scale fading resulted from refraction and scattering are inevitable. Subsequently, the real-number field orthogonality described by formula (2) is destroyed by a complex channel resulted from fading. Suppose channel fading coefficient corresponding to the $m^{th}$ subcarrier of the $n^{th}$ symbol is $h_{m,n}$ signals passing an AF group is represented as follows.

$$r_{m,n} = h_{m,n} a_{m,n} + \underbrace{\sum_{(m',n') \neq (m,n)} h_{m',n'} a_{m',n'} \langle g_{m',n'} | g_{m,n} \rangle}_{\text{固有干扰}} + \eta_{m,n}, \quad (3)$$

$$m = 0, \ldots, M = 1, n \in \mathcal{Z}$$

The second item in formula (4) is directly related with prototype filter design, which is referred to as intrinsic interference of the FBMC/OQAM system. Take into account of well TFL characteristics of the prototype filter, each sub-carrier in the foregoing formula receives interferences of sub-carriers within a limited area around. And such area set is defined as an interference area $\Phi_{m,n}$. Take into account of prototype filter properties in formula (2), when channel fading coefficient $h_{m,n}$ is a real number, or (m', n') $\in \Phi_{m,n}$, and then $h_{m',n'} \sim h_{m,n}$. Subsequently, intrinsic interference item in formula (4) is a pure imaginary number. Transmitted signal $a_{m,n}$ is restored, by using a simple equalization and operation of taking real part in formula (3). $h_{n',n'}$ represents a channel fading coefficient corresponding to the $m'^{th}$ subcarrier of the $n'^{th}$ symbol. However, for a fading channel, particularly for a channel with strong time selectivity or strong frequency selectivity, even if (m',n')$\in\Phi_{m,n}$, condition $h_{m',n} \approx h_{m,n}$ is not held. At this time, intrinsic interference item, which is a pure imaginary number originally, generates interferences for signals transmitted by real part. Take a simple zero-forcing equalization as an example, equalized signal is represented as follows.

$$\hat{r}_{m,n} = \quad (4)$$

$$\frac{r_{m,n}}{h_{m,n}} = a_{m,n} + \sum_{(m',n') \in \Phi_{m,n}} \frac{h_{m',n'}}{h_{m,n}} a_{m',n'} \langle g_{m',n'} | g_{m,n} \rangle + \hat{\eta}_{m,n}$$

In the foregoing formula, $\hat{\eta}_{m,n} \eta_{m,n}/h_{m,n}$ represents an equalized equivalent noise. It can be seen that, when $h_{m',n} \neq h_{m,n}$, interferences of original pure imaginary part is spread to real part, which leads to ICI and ISI. This kind of interferences are not reduced, accompanying with increasing SNR. Subsequently, system generates an error floor in a scene with higher SNR. For a high-speed mobility scene (strong time selective fading) and an environment with strong frequency selectivity, channel coefficients of adjacent sub-carriers and symbols are significantly different. Thus, error floor problem becomes more significant, which can have a severe impact on system link reliability.

A First Embodiment

The embodiment provides a method for processing error floor problem, which is resulted from intrinsic interference in a high-speed mobility environment, when processing OQAM modulation DB, accompanying with specific filter parameter setting and system configuration. When one system uses M=256 subcarriers, and effective subcarrier number is 120, 12 adjacent subcarriers of every 28 OQAM symbols ($\mathcal{Z}=\{0, 1, 2, \ldots, 27\}$) constitutes a Physical Resource Block (PRB). OQAM system overlapping factor K=4. Filter parameter uses PHYDYAS filter. Time-domain response thereof is represented as follows.

$$g(0) = 0,$$
$$g(l) =$$
$$1 - 1.94392\cos\left(\frac{2\pi l}{L_g}\right) + 1.414\cos\left(\frac{4\pi l}{L_g}\right) - 0.47029\cos\left(\frac{6\pi l}{L_g}\right),$$
$$1 \leq l \leq L_g = 1$$
here, $L_g = KM = 1024$.

Since foregoing PHYDYAS filter possesses well TFL characteristics, main interference source is generated by adjacent subcarriers and symbols, interference area is defined as follows, $\Phi_{m,n}=\{(m', n')|m', n'\in\mathcal{Z}, |m-m'|\leq 1, |n-n'|\leq 1\}$. That is, only consider interferences generated by symbols of 8 subcarriers around. In a high-speed mobility environment, change speed of adjacent subcarrier channel coefficient is much lower than change speed of adjacent symbol channel coefficient. Thus, it can be considered that the influence on system resulted from intrinsic interference is mainly the ISI. Compared with ISI, ICI can be ignored. To reduce or eliminate ISI resulted from the intrinsic interference, one PRB is divided into two Resource Blocks (RBs) in the embodiment. These two RBs shares the same time resources. However, the first RB uses first six subcarriers, so as to transmit original data. The second RB uses latter six subcarriers, so as to transmit conjugate of original data. That is, subcarriers #1~#6 transmits QAM symbols $\mathcal{X}_{1,n}\sim\mathcal{X}_{6,n}$, while subcarriers #7~#12 transmits $\mathcal{X}_{1,n}^*\sim\mathcal{X}_{6,n}^*$. Suppose data transmitted on subcarriers #1~#6 is DB1 and data transmitted on subcarriers #7~#12 is DB2, it can be seen that, in the embodiment, after performing a complex conjugate to symbols in DB1, DB2 is obtained by transmission of an adjacent subcarrier group of the subcarrier group transmitting DB1.

Figure 2:
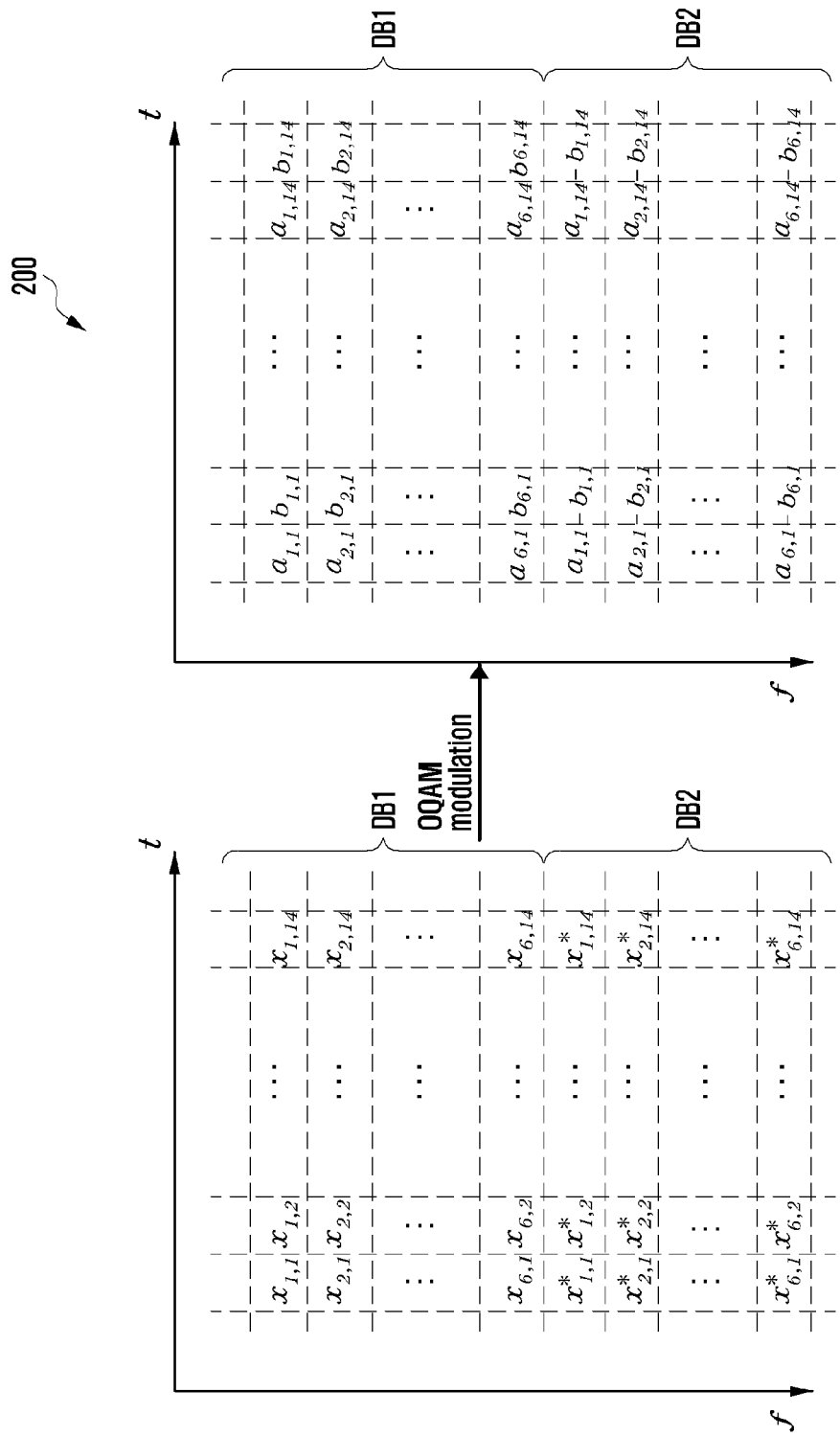
FIG. 2 is a schematic diagram illustrating preprocessing of a transmitter for strong time selective fading, in accordance with an embodiment of the present disclosure.

The schematic diagram 200 about the time frequency symbol after OQAM modulation is shown in FIG. 2. In FIG. 2, $a_{m,n}$ and $b_{m,n}$ are PAM symbols, which can be respectively the real part and imaginary part of QAM symbol That is, $\mathcal{X}_{m,n}\mathcal{X}_{m,n}=a_{m,n}+jb_{m,n}$. After OQAM modulation, adjacent PAM symbols is respectively modulated into real part and imaginary part of a subcarrier, to guarantee real-number domain orthogonality of OQAM system. Based on FIG. 2, it can be seen that, when not consider channel coefficient change of different subcarriers resulted from channel frequency selectivity, for real part $a_{m,n}$ of QAM symbol $\mathcal{X}_{m,n}$, received interference in DB1 thereof can be an opposite number of received interference in DB2 thereof. Thus, the interferences can be eliminated at the receiver by using a simple combination operation. Meanwhile, for imaginary part $b_{m,n}$ of QAM symbol $\mathcal{X}_{m,n}$, received interferences in the two DBs are the same. However, transmitted data thereof is an opposite number of each other. Thus, such interferences can also be eliminated at the receiver by using a simple combination operation.

Figure 3:
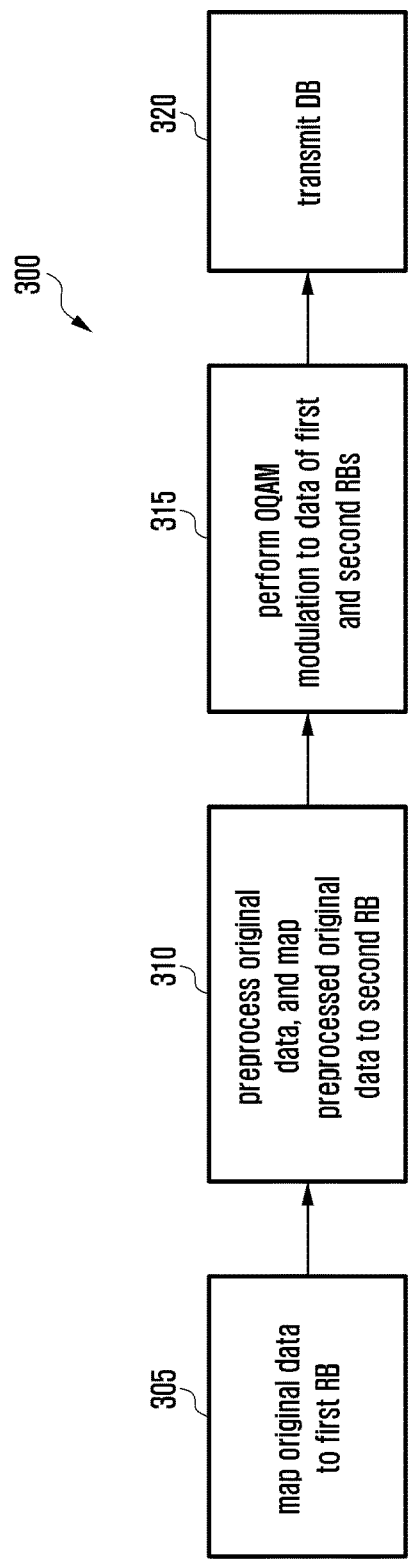
FIG. 3 is a flowchart illustrating a method for a transmitter to preprocess a DB, in accordance with an embodiment of the present disclosure.

Based on the foregoing criteria, block diagram 300 of a transmitter for transmitting a signal is as shown in FIG. 3, which includes as follows. Transmitter maps 305 an original DB including at least one symbol to a first RB, preprocesses 310 the original DB, and maps the preprocessed original DB to a second RB. The transmitter then modulates 315 data of the first and second RBs by using FBMC modulation, and transmits 320 the data modulated.

Suppose channel frequency selectivity is weaker, that is, intrinsic interference of the OQAM system basically has no impact on frequency-domain real part orthogonality. That is, after taking the real part, residual ICI can be ignored. After OQAM demodulation and equalization, estimated value of real part $a_{m,n}$ signal in DB1 obtained by receiver is written as follows.

$$\hat{r}_{m,n}{}^a = a_{m,n} + jd_{m,n}{}^a I_{m,n}{}^a + d_{m,n}{}^a I_{m,n}{}^b + \eta_{m,n}{}^a \quad (5)$$

In the foregoing formula, $d_{m,n}{}^a$ represents an equalization coefficient needed by real part signal $a_{m,n}$. $I_{m,n}{}^a$ represents a real number, which denotes the ICI resulted from intrinsic interference of the FBMC/OQAM system. $I_{m,n}{}^b$ represents a complex number, which denotes ISI resulted from intrinsic interference of the FBMC/OQAM system. $\eta_{m,n}{}^a$ represents an equalized equivalent noise. Suppose a corresponding time frequency point for transmitting $a_{m,n}$ in DB2 is (m',n), the received signal of the time-frequency position is represented as follows.

$$\hat{r}_{m',n}{}^a = a_{m,n} + jd_{m',n}{}^a I_{m',n}{}^a - d_{m',n}{}^a I_{m',n}{}^b + \eta_{m',n}{}^a \quad (6)$$

Based on FIG. 2, it can be seen that, interference symbol generated by DB2 for $a_{m,n}$ is the same as that generated by DB1, and subsequently $I_{m',n}{}^6 = I_{m,n}{}^6$. When channel frequency selectivity is weaker, $d_{m',n}{}^a \sim d_{m,n}{}^a$. Thus, real part signal $a_{m,n}$ can be simply estimated as follows.

$$\hat{a}_{m,n} + \Re\{(\hat{r}_{m,n}{}^a + \hat{r}_{m',n}{}^a)/2\} \quad (7)$$

Similarly, obtained estimation for imaginary part signal $b_{m,n}$ can be as follows.

$$\hat{b}_{m,n} = \Re\{(\hat{r}_{m,n}{}^b - \hat{r}_{m',n}{}^b)/2\} \quad (8)$$

In the foregoing formula, after equalizing $b_{m,n}$ in corresponding position of DB1 and DB2, the obtained signal are respectively represented by $\hat{r}_{m,n}{}^b$ and $\hat{r}_{m',n}{}^b$.

Figure 4:
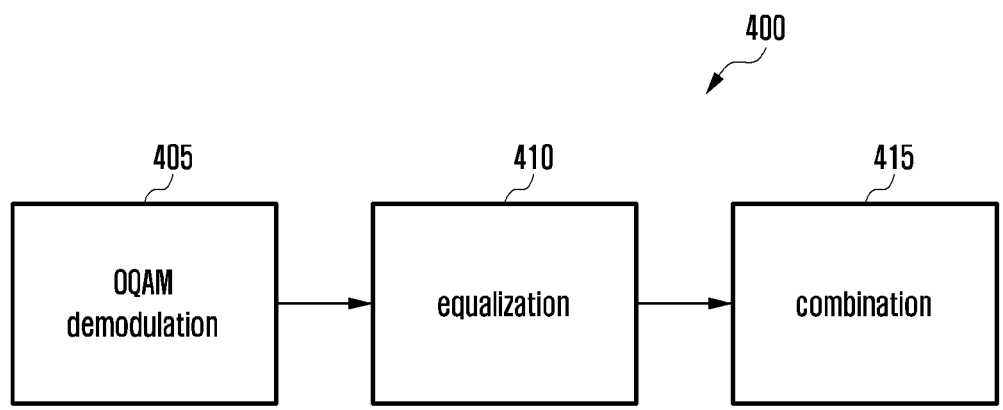
FIG. 4 is a flowchart illustrating a method for a receiver to process a received signal, in accordance with an embodiment of the present disclosure.

FIG. 4 is a schematic diagram 400 illustrating a method for a receiver to process received signals, in accordance with an embodiment of the present disclosure, which includes as follows. After receiving a DB, receiver demodulates 405 the DB by using a FBMC-based demodulation mode, equalizes 410 each demodulated symbol, and finally combines 415 equalized DBs based on DB size predefined by system.

In addition, in FIG. 2, data transmission sequence in DB2 is the same as that in DB1. At this time, some residual ISI exists in symbols at the edge of each DB, since these edge data symbols receive different interferences in different DBs. Actually, to further reduce residual ISI, data transmission sequence in DB2 is contrary to that in DB1. That is, subcarriers #-#12 is used to transmit complex conjugate of symbols transmitted on subcarriers #~#1 in sequence. At this time, interferences received by symbols respectively transmitted on subcarriers #6 and #7 come from the same symbol. Subsequently, the interferences can be totally eliminated by using formulas (8) and (9). Thus, number of edge symbols is reduced, and residual ISI is further eliminated. In a simulation result figure, a same sequence is used to transmit data of DB1 and DB2 in solution 1. Meanwhile, a reverse transmission sequence is used to transmit the data of DB1 and DB2 in solution 2.

Figure 5:
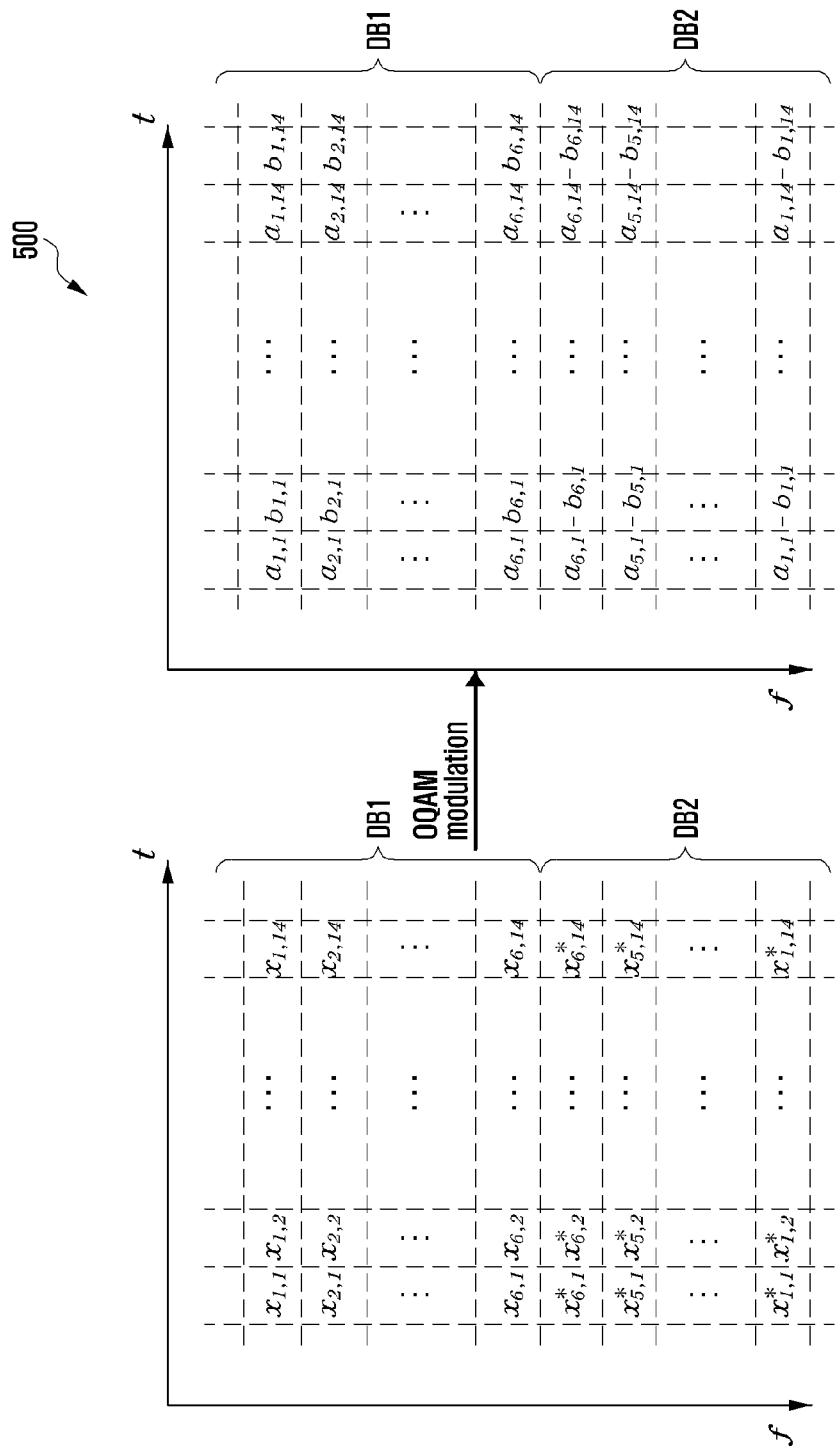
FIG. 5 is a schematic diagram illustrating preprocessing of a transmitter, when solution 2 of the present disclosure is employed.

FIG. 5 is a schematic diagram 500 illustrating preprocessing of a transmitter, when solution 2 of the present disclosure is used.

Effectiveness of strong time selective fading channel in the embodiment is described in the following, accompanying with a simulation result. The system employs a Quadrature Phase Shift Keying (QPSK) modulation. As a comparative object, take into account of an OQAM system, subcarriers #~#12 thereof is used to repeatedly transmit data already transmitted on subcarriers #1~#6. Data rate of the OQAM system is the same as data rate achievable in the embodiment.

Figure 6:
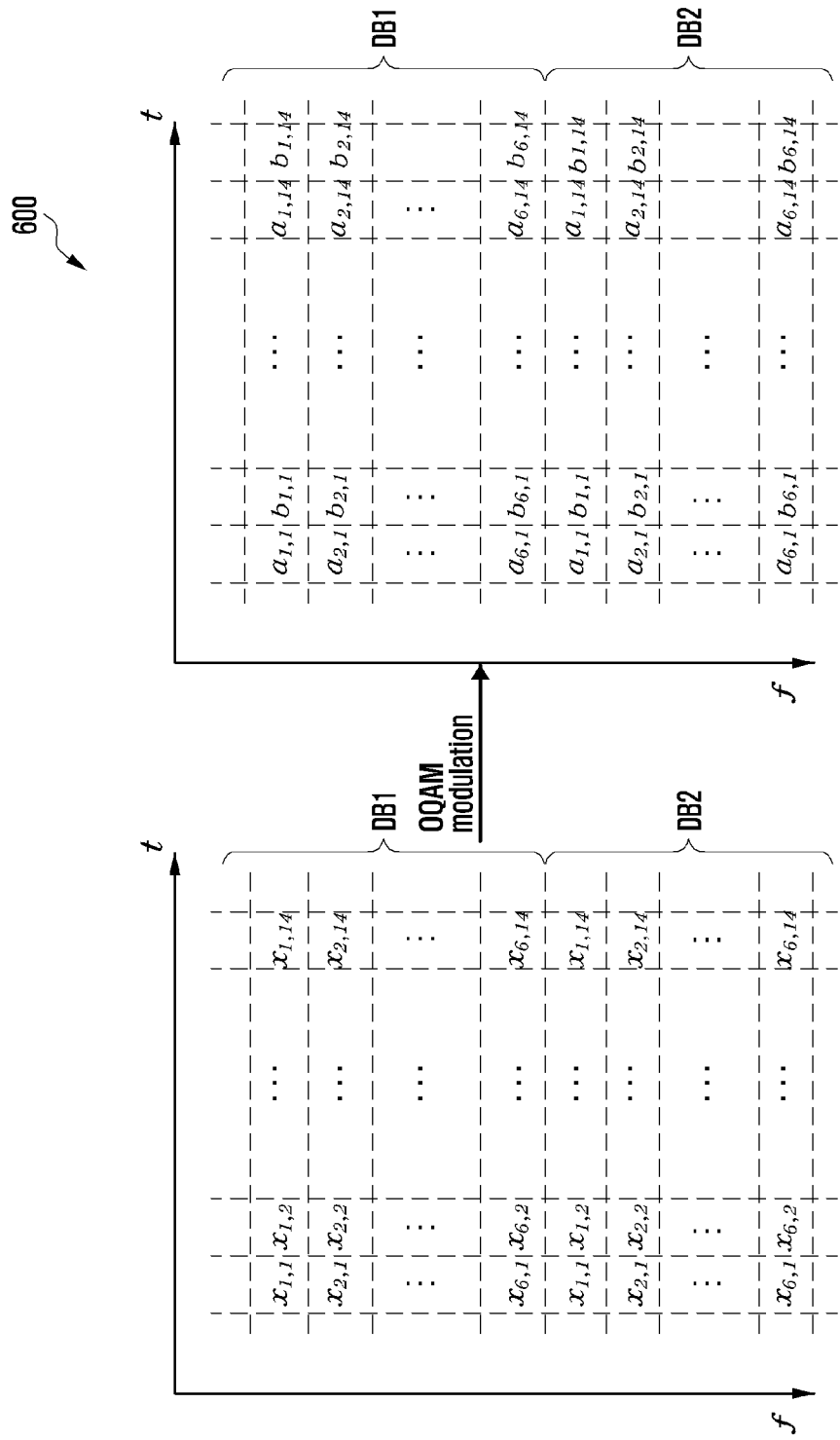
FIG. 6 is a schematic diagram illustrating processing of a transmitter in a comparative solution.

FIG. 6 is a schematic diagram 600 illustrating processing of a transmitter in a comparative object.

First of all, consider a single-path channel, that is, a channel only has a direct path, meanwhile, user mobility speed is 300 km/h.

Figure 7:
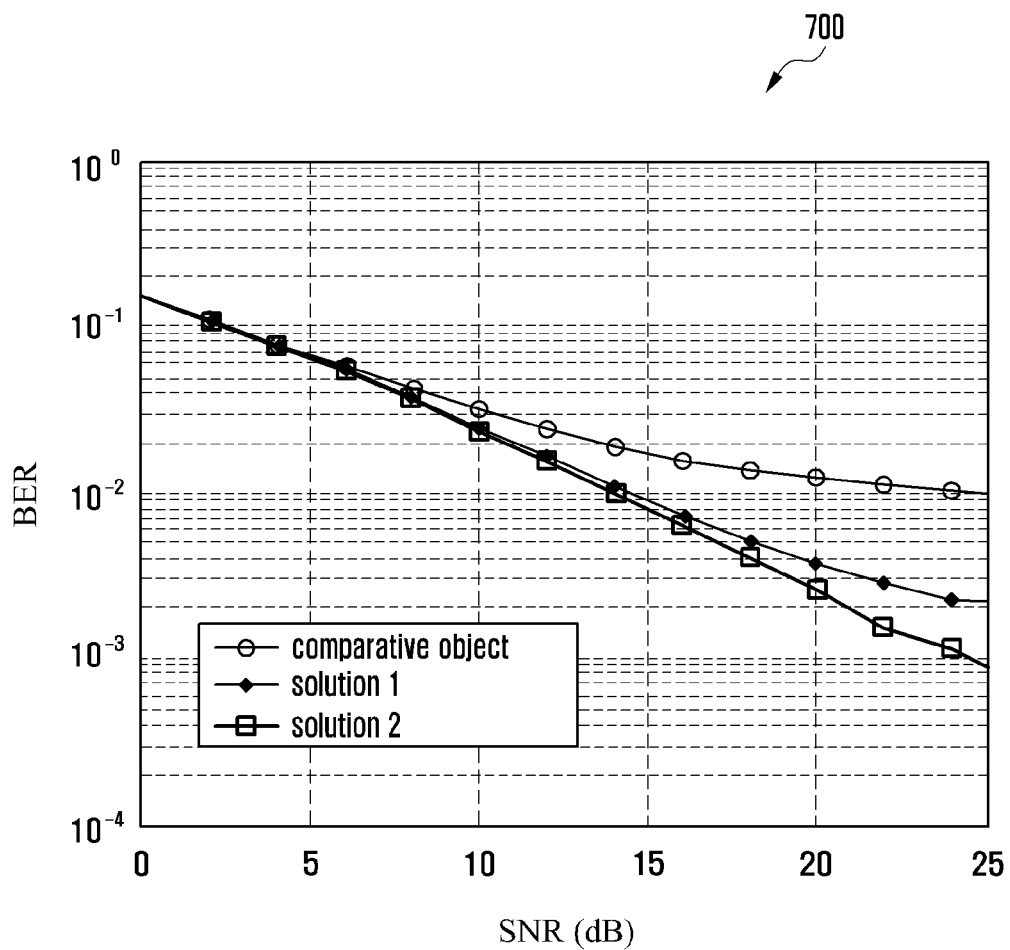
FIG. 7 is a schematic diagram illustrating Bit Fixer Rate (BER) comparison in different solutions of a single-path high-speed scene, in accordance with an embodiment of the present disclosure.

FIG. 7 illustrates BER curves 400 of two solutions under such circumstances. In FIG. 7, solution 1 and solution 2 respectively represent the following scenes. Symbol sequence of subcarriers #7~#12 is the same as that of subcarriers #1~#6 in solution 1. Symbol sequence of subcarriers #7~#12 is contrary to that of subcarriers #1~#6 in solution 2. Different solutions possess similar performance with lower SNR. Due to high user mobility speed, intrinsic interference of OQAM system leads to serious ISI, such that an error floor with BER $10^{-2}$ occurs in a scene with higher SNR by using the comparative solution, which will have a serious impact on system error performance. Meanwhile, solution 1 effectively eliminates ISI, and can significantly reduce error floor resulted from the ISI. Solution 2 can further eliminate ISI resulted from intrinsic interference, such that error floor will still not occur after SNR of the BER curve is greater than 20 dB, which can prove that error performance achieved by the embodiment under such channel condition is far better than that of the comparative solution.

Subsequently, error performances of various solutions are compared with each other, when user mobility speed in the EPA channel is 300 km/h.

Figure 8:
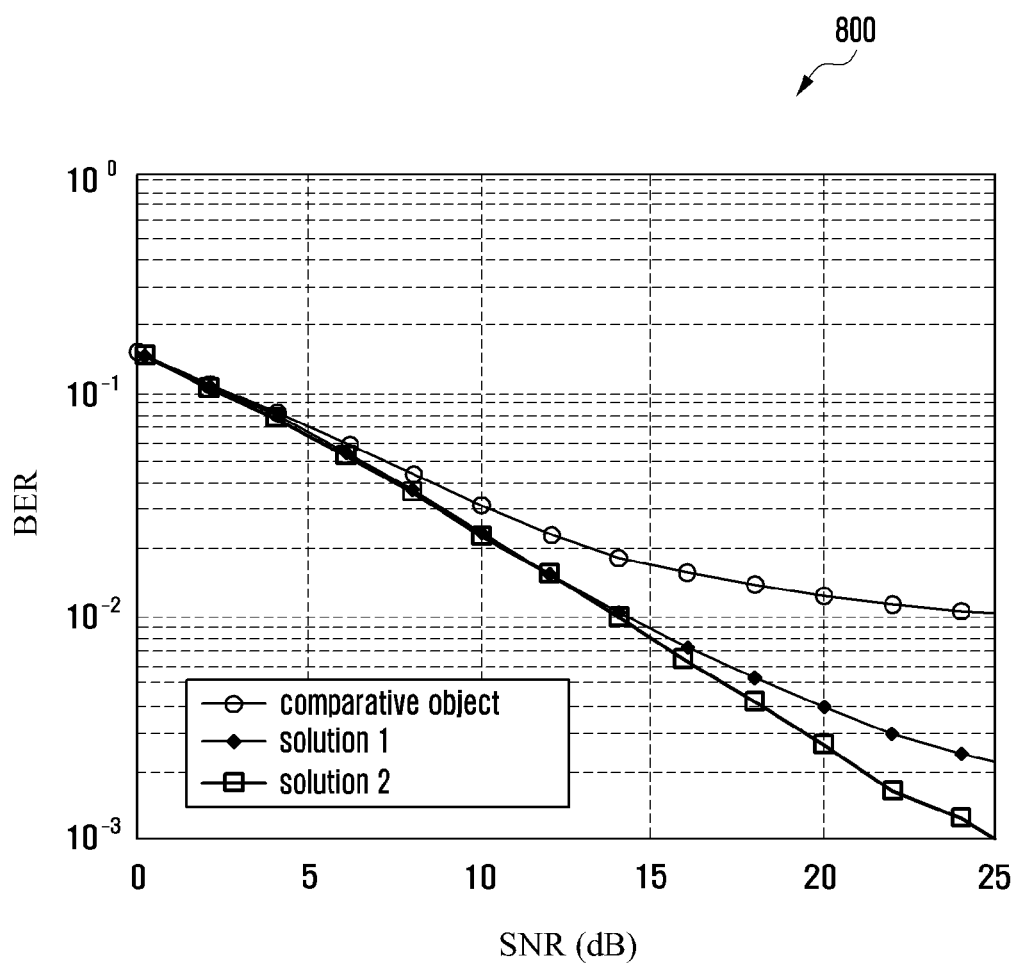
FIG. 8 is a schematic diagram illustrating BER comparisons in different solutions of an Extended Pedestrian A (EPA) channel high-speed scene, in accordance with an embodiment of the present disclosure.

FIG. 8 is a schematic diagram 800 illustrating BER comparisons of different solutions hi the EPA channel, in accordance with an embodiment of the present disclosure. Compared with a single-path channel, the EPA channel has a certain frequency selectivity, however there is little difference between channel coefficients of adjacent subcarriers, which has a small impact on system. In such channel environment, the solution put forward by the embodiment can still effectively eliminate error floor, which is resulted from intrinsic interference of time selective fading channel.

Figure 9:
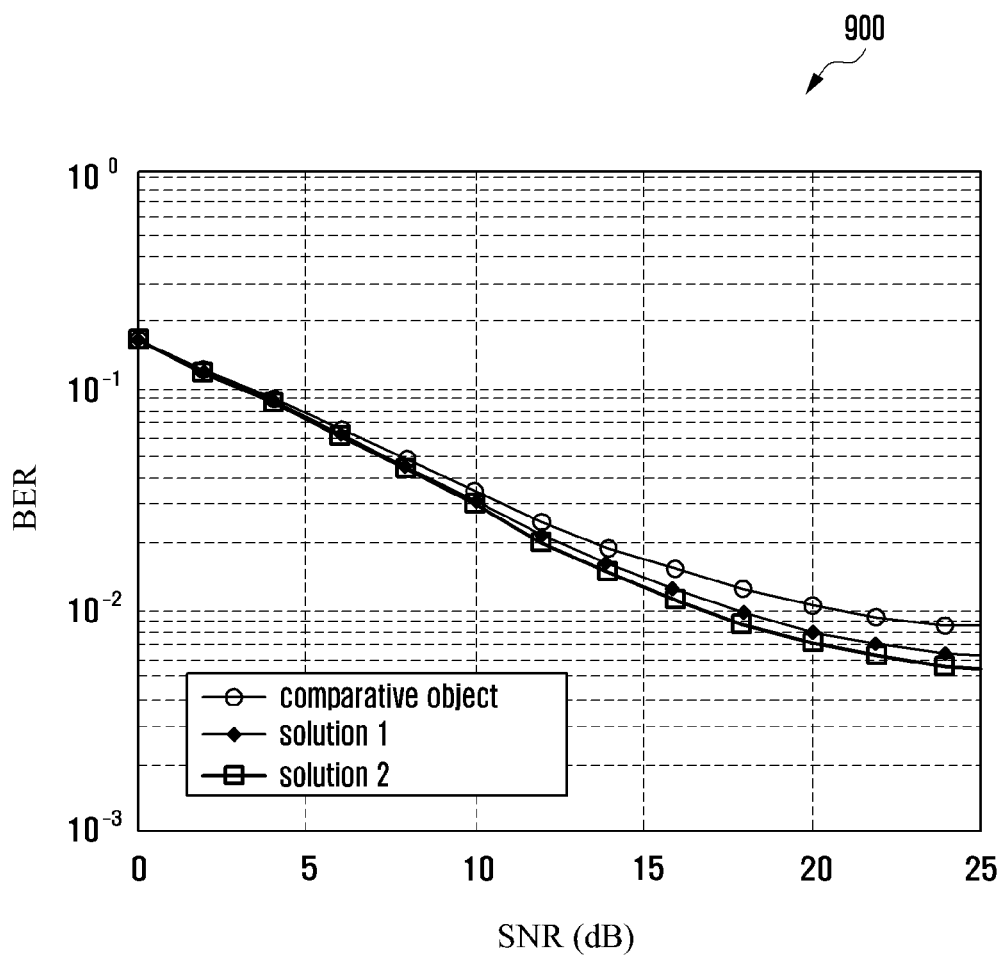
FIG. 9 is a schematic diagram illustrating BER comparisons in different solutions of an Extended Typical Urban model (ETU) channel high-speed scene, in accordance with an embodiment of the present disclosure.

FIG. 9 is a schematic diagram 900 illustrating comparisons of error performances of various solutions, when user mobility speed is 300 km/h in an ETU channel. Compared with foregoing EPA channel, frequency selectivity of ETU channel is more obvious, and there is greater difference between channel coefficients of adjacent subcarriers. System performance is further reduced resulted from strong frequency selectivity, meanwhile performance of the method put forward by the embodiment is also affected. However, compared with the comparative solution, the solution put forward by the embodiment, particularly solution 2, can still significantly reduce position of error floor, and delay occurrence of error floor.

When PAM is used, the preprocessing performed to original DB includes as follows. Take an opposite number for each symbol of even OQAM symbols or odd OQAM symbols of the original DB.

A Second Embodiment

In the first embodiment, a method for performing a conjugate to original DB and transmitting on adjacent subcarrier group is used. Such method possesses obvious advantages, when resisting a strong time selectivity fading channel, which can also lower error floor resulted from the ISI. However, such method no longer possesses advantages in a strong frequency selectivity channel. At this time, it is necessary to adjust preprocessing mode performed to DB, to adapt to channel change. Specifically speaking, to resist frequency selectivity, resource allocation modes of the first RB and second RB should be modified firstly. In such scene, two RBs use the same frequency resources. However, the first RB uses first 14 symbols, which is used to transmit original data, while the second RB uses latter 14 symbols, which is used to transmit preprocessed DBs. To generate the same interference, the preprocessing method is as follows. Data transmitted on odd subcarriers remains unchanged. Take an opposite number for data transmitted on even subcarriers.

Figure 10:
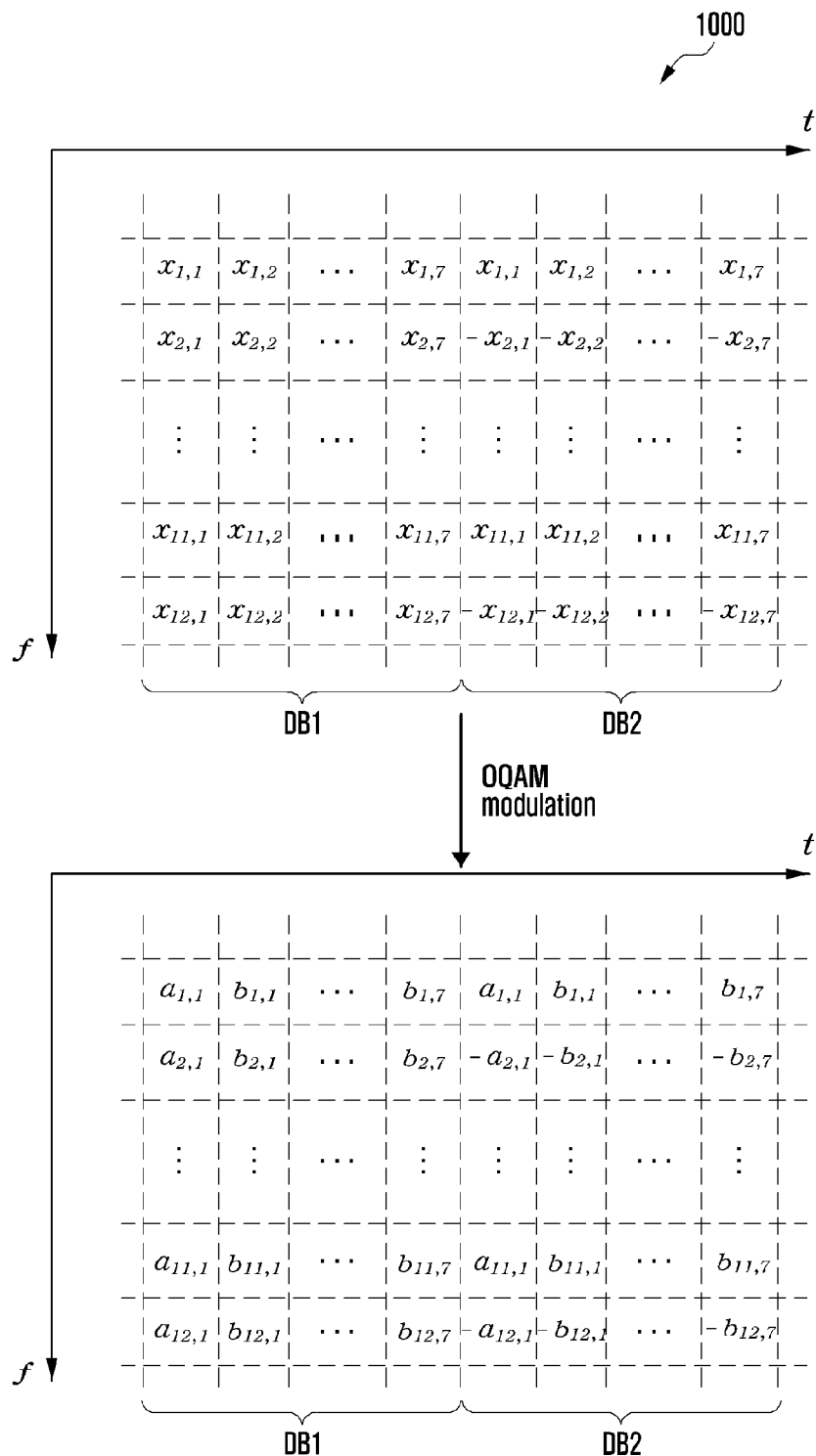
FIG. 10 is a schematic diagram illustrating preprocessing of a transmitter for stronger frequency selective fading, in accordance with an embodiment of the present disclosure.

Still suppose data transmitted on the first RB is DB1, and data transmitted on the second RB is DB2, at this time, a schematic diagram 1000 illustrating a method for transmitter to preprocess transmitted data in the embodiment can be as shown in FIG. 10.

Based on FIG. 10, it can be seen that, interference amplitude received by a symbol in DB1 is still the same as that received by another symbol at a corresponding position of corresponding DB2. Thus, die transmitted signal can be restored at the receiver, by using a simple equalization and combination operation. Specifically speaking, for symbols transmitted on odd subcarriers, formula (10) is used to execute combination and data restoring. For symbols transmitted on even subcarriers, formula (11) is employed to execute combination and data restoring.

$$\hat{c}_{m,n} = \Re\{(\hat{r}_{m,n} + \hat{r}_{m,n'})/2\} \tag{9}$$

$$\hat{c}_{m,n} = \Re\{(\hat{r}_{m,n} - \hat{r}_{m,n'})/2\} \tag{10}$$

$c_{m,n}$ represents symbol of time frequency point (m, n) after executing OQAM modulation. $\hat{c}_{m,n}$ represents an estimated value of $c_{m,n}$. $\hat{r}_{m,n}$ and $\hat{r}_{m,n'}$ respectively represent a symbol of equalized time frequency points (m, n) and (m, n'). It should be noted that time frequency points (m, n) and (m, n') are respectively located in DB1 and DB2. Information transmitted on (m, n) and (m, n') is the same.

It should be noted that, the preprocessing method in the foregoing example is as follows. Data transmitted on odd subcarriers remains unchanged. However, take an opposite number for data transmitted on even subcarriers. In practical applications, a reverse preprocessing method is also used. That is, data transmitted on even subcarriers remains unchanged. Take an opposite number for data transmitted on odd subcarriers. Correspondingly, formula (11) is used to combine symbols transmitted on odd subcarriers, when executing combination. Formula (10) is used to combine symbols transmitted on even subcarriers.

Effectiveness for strong frequency selective fading channel achieved by the embodiment will be described, by using simulation result. System employs the QPSK modulation. To ensure simulation fairness, in the comparative solution of the simulation, data transmitted in DB2 is totally the same as data transmitted in DB1, without executing any preprocessing. Thus, these two solutions achieve the same data rate. The channel module employs an ETU module with strong frequency selectivity.

Figure 11:
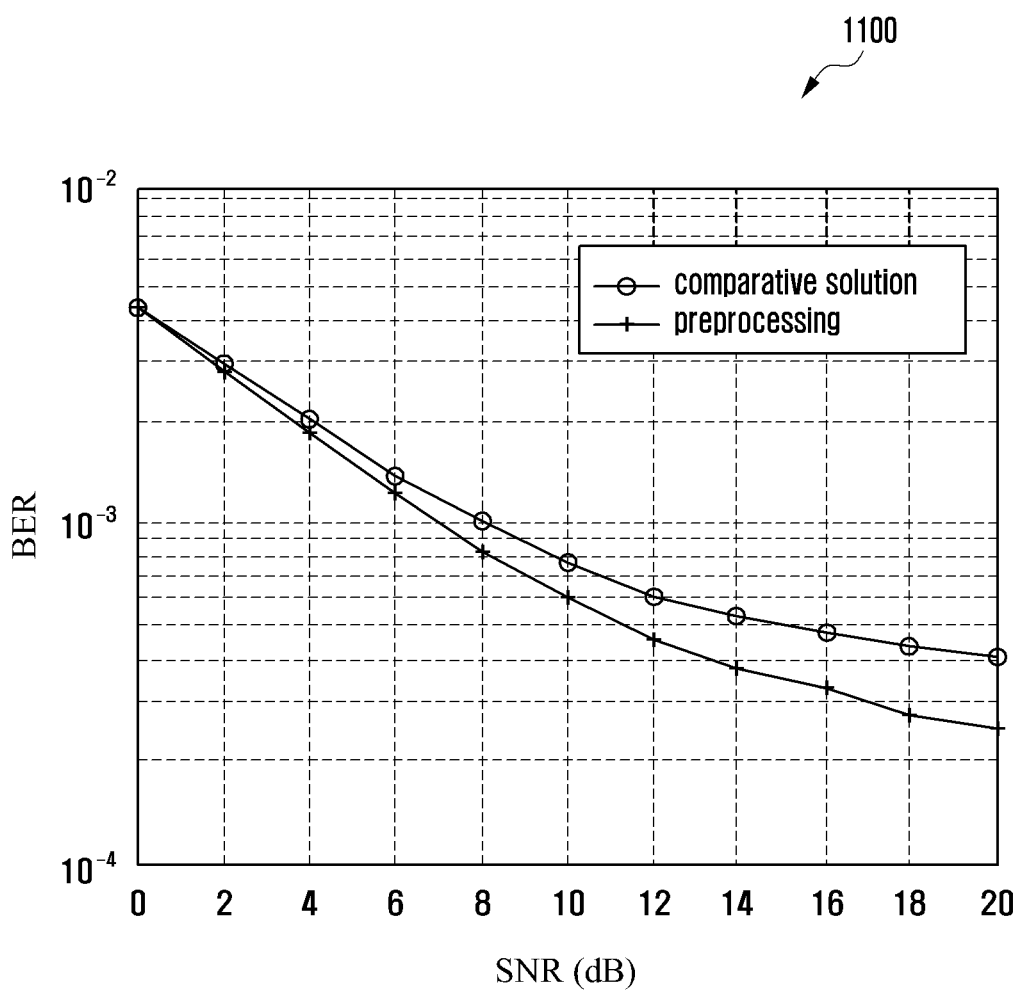
FIG. 11 is a schematic diagram illustrating BER comparisons in different solutions of an ETU channel, in accordance with an embodiment of the present disclosure.

FIG. 11 is a schematic diagram 1100 illustrating BER performance comparisons in different solutions by using the ETU channel module, when receiver is static. In the ETU channel, compared with comparative solution, the embodiment can significantly reduce error floor. In a scene with lower SNR, error performances of these two solutions are similar. However, in a scene with higher SNR, the solution provided by the embodiment possesses a faster BER descent speed. When the BER is, compared with the comparative solution, advantageous 6 dB is achieved by the solution of the embodiment.

A Third Embodiment

The first and second embodiments respectively provide a solution for strong time selective fading and strong frequency selective fading.

The embodiment will provide a solution of the present disclosure, when foregoing two kinds of fading exist simultaneously and respectively fading strength is strong. To simultaneously reduce the ISI and ICI resulted from intrinsic interference of system, the following two methods can be combined. Take conjugate of original DB in the first embodiment. Take an opposite number of the original DB every other subcarrier in the second embodiment. The method is briefly described as follows.

The resource allocation mode similar to that in the second embodiment can be used. That is, the first RB and the second RB employ the same frequency resources. The first RB uses first 14 symbols of each PRB, which is used to transmit the original DB. The second RB uses latter 14 symbols of each PRB, which is used to transmit preprocessed DBs. When executing the preprocessing, firstly perform a conjugate to original DB, and then take an opposite number of each symbol on even subcarriers. At this time, a schematic diagram 1200 illustrating transmitter to preprocess data to be transmitted in the embodiment is shown in FIG. 12.

Figure 12:
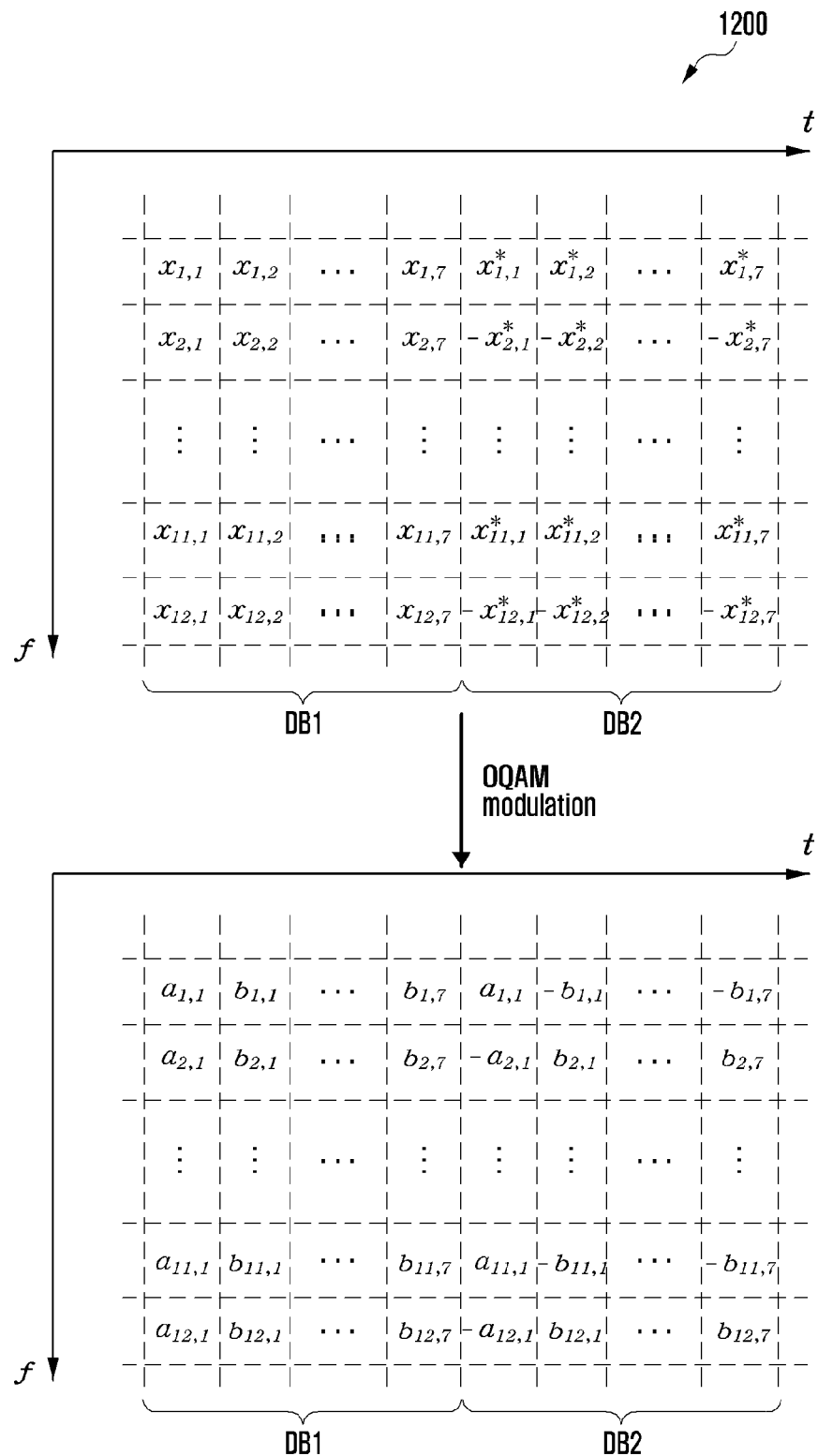
FIG. 12 is a schematic diagram illustrating a transmitter to preprocess data to be transmitted, when frequency selectivity and time selectivity exist simultaneously, in accordance with an embodiment of the present disclosure.

Based on FIG. 12, it can be seen that after preprocessing, interference amplitude coming from adjacent symbols of same subcarriers and that coming from same symbols of adjacent subcarriers, which are received by symbols at a corresponding position of DB1 and DB2, are the same. Thus, after executing a combination operation, interferences generated by these symbols can be totally eliminated. Specifically speaking, for real part of each symbol transmitted on odd subcarriers and imaginary part of each symbol transmitted on even subcarriers, formula (10) is used to execute combination and data restoring. For imaginary part, of each symbol transmitted on odd subcarriers and real part of each symbol transmitted on even subcarriers, formula (11) is used to execute combination and data restoring. It should be noted that, sequence of foregoing preprocessing can be changed. That is, firstly take an opposite number of each symbol of even subcarriers, and then take a conjugate of the result. At this time, corresponding combination operations are also necessary to be swapped. That is, for real part of each symbol transmitted on odd subcarriers and imaginary part of each symbol transmitted on even subcarriers, formula (11) is used to execute combination and data restoring. For imaginary part of each symbol transmitted on odd subcarriers and real part of each symbol transmitted on even subcarriers, formula (10) is used to execute combination and data restoring.

In addition, similar effects can be obtained, by using similar resource allocation mode of the first embodiment. The first RB and the second RB use the same time resources. However, the first RB uses first 6 subcarriers of each PRB, which is used to transmit the original DB. The second RB uses latter 6 subcarriers of each PRB, which is used to transmit preprocessed DBs. The preprocessing mode can be as follows. Firstly, perform a conjugate to the original DB. And then, take an opposite number to data of even subcarriers. Combination operation of receiver is as follows. For real part of each symbol transmitted on odd subcarriers and imaginary part of each symbol transmitted on even subcarriers, formula (8) is used to execute combination and data restoring. For imaginary part of each symbol transmitted on odd subcarriers and real part of each symbol transmitted on even subcarriers, formula (10) is used to execute combination and data restoring. It should be noted that preprocessing sequence of DB can be swapped, which will not be repeated here.

A Fourth Embodiment

The embodiment provides applications of the present disclosure in a multi-antenna system. Compared with a single antenna system, for inter-link interference in the multi-antenna system, preceding executed by the transmitter and equalization operations executed by the receiver are even more complicated. However, the solution provided by the present disclosure is still be applicable to the multi-antenna system.

Figure 13:
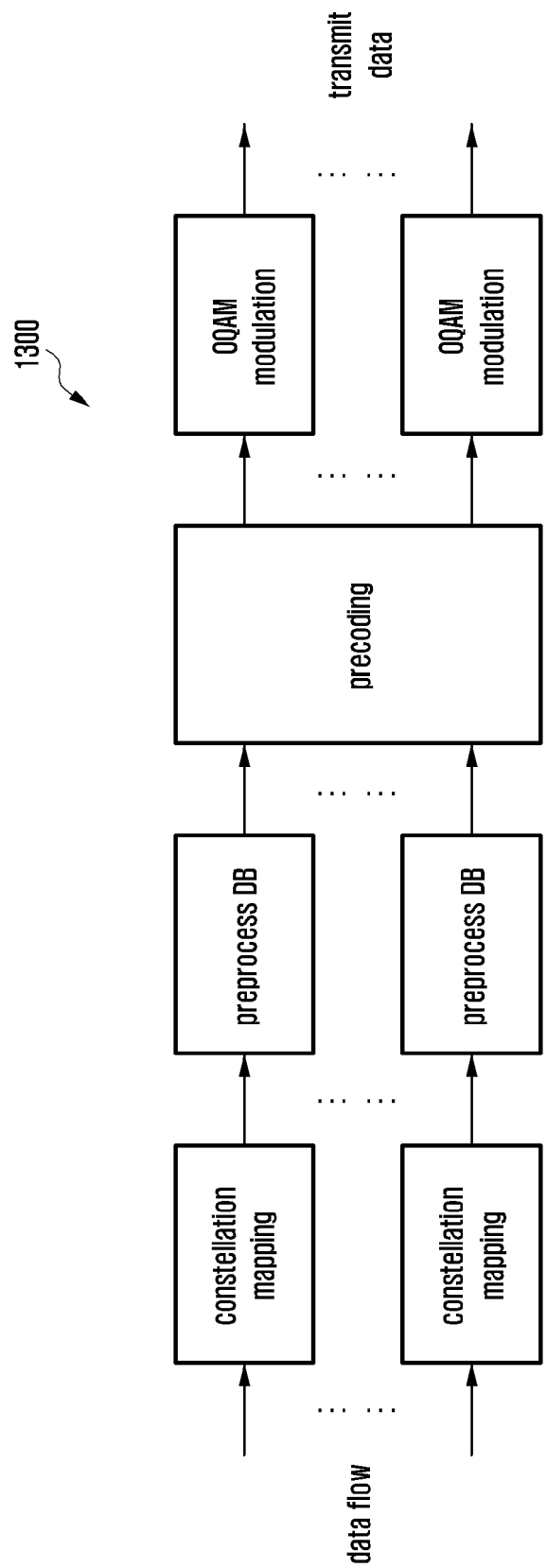
FIG. 13 is a block diagram illustrating a transmitter in a multi-antenna system, in accordance with an embodiment of the present disclosure.
Figure 14:
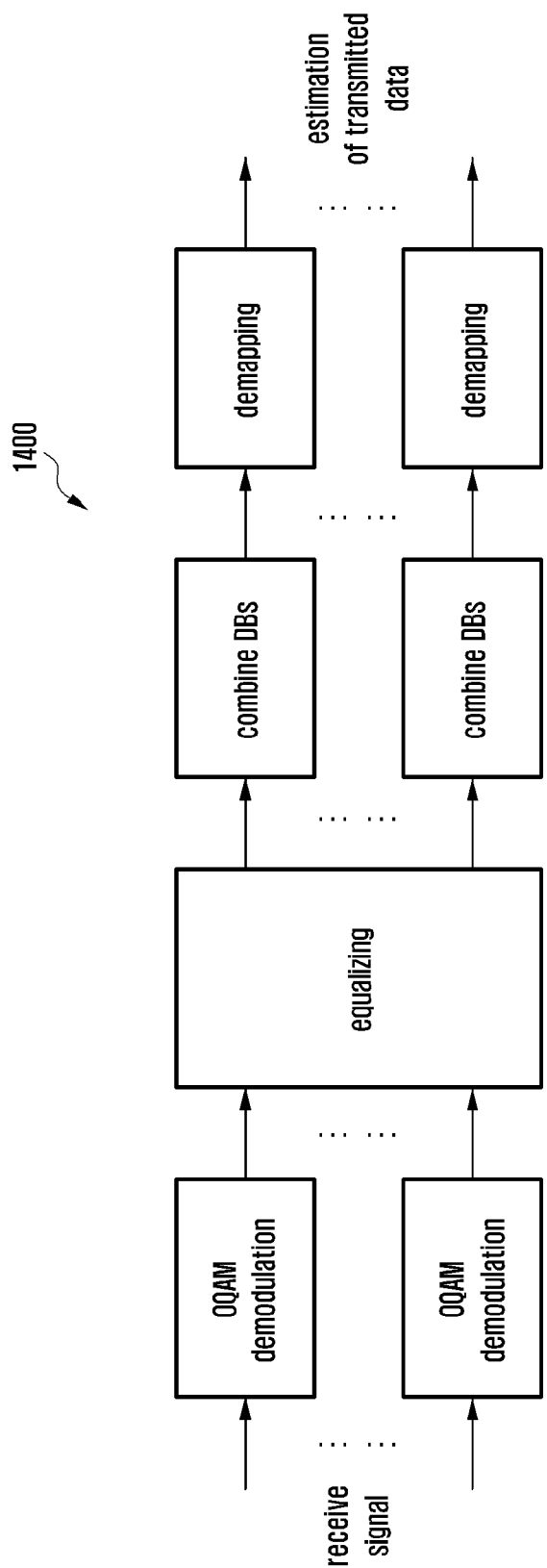
FIG. 14 is a block diagram illustrating a receiver in a multi-antenna system, in accordance with an embodiment of the present disclosure.

FIG. 13 and FIG. 14 are respectively schematic diagrams 1300, 1400 illustrating transmitter and receiver in a multi-antenna system, in accordance with embodiments of the present disclosure.

It can be seen that, different from the single antenna system, a precoding module is necessary to be added between DB preprocessing and OQAM modulation, by a transmitter hi a multi-antenna system, so as to reduce or eliminate inter-link interference. Take into consideration that the precoding operations perform the same processes to symbols of same time frequency resources, time frequency structure after DB preprocessing will not be affected. Receiver structure is similar to that of the single-antenna system.

The solution provided by the embodiment is still effective in the multi-antenna system, which will be described with simulation. Take into consideration that transmitter and receiver are both equipped with multi-antenna system of two antennas, transmitter is not execute preceding (or preceding matrix is a unit matrix). The receiver uses a Minimum Mean Square Error (MMSE) equalization algorithm. Channel module respectively uses a single-path channel and an ETU channel. Receiver mobility speed is 300 km/h. It can be seen that, the channel possesses strong time selectivity. Thus, the transmitter uses a solution similar to that in the first embodiment, that is, to preprocess the original DB.

The preprocessing schematic diagram can be shown in FIG. 2. The receiver uses formulas (8) and (9) to perform combination operations to received signals. A system, in which DB2 totally repeats data of DB1, is taken as a comparative object.

Figure 15:
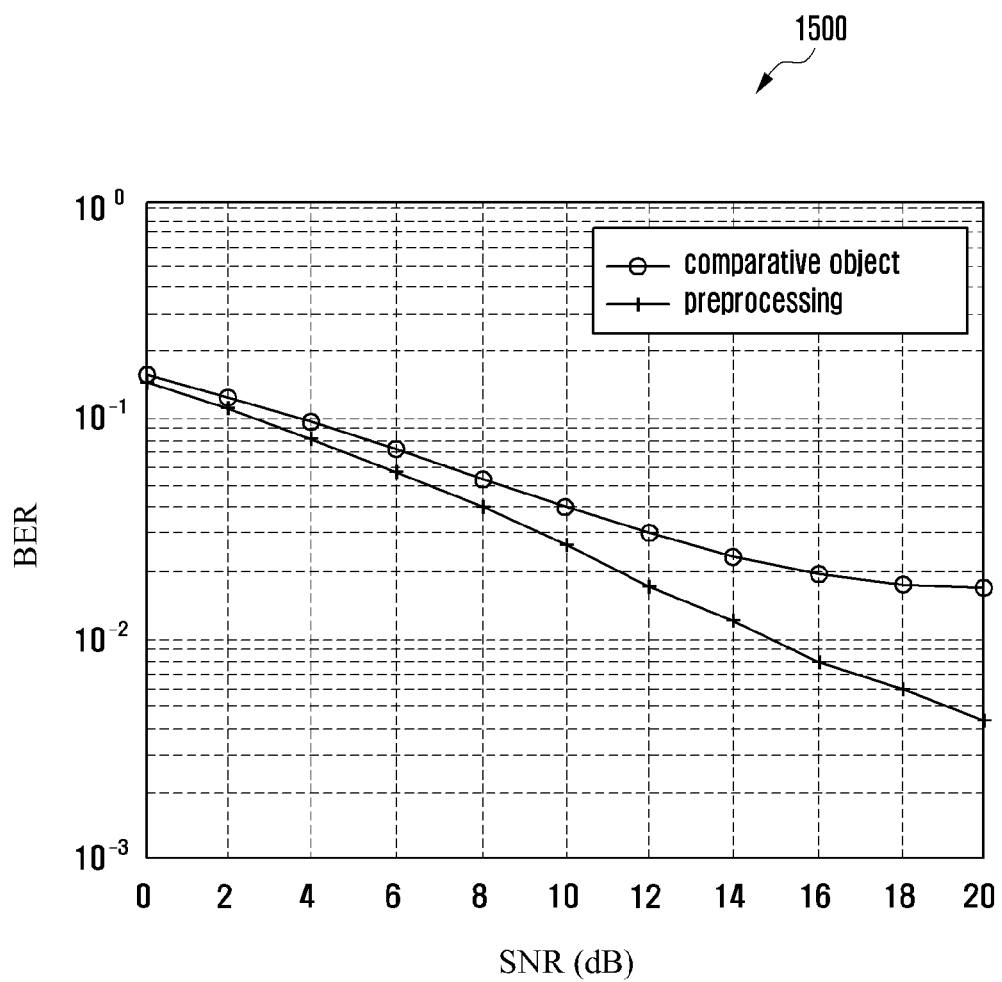
FIG. 15 is a schematic diagram illustrating BER comparisons in different solutions of a single-path high-speed scene in a multi-antenna system, in accordance with an embodiment of the present disclosure.

FIG. 15 is a schematic diagram 1500 illustrating BER comparisons in different solutions of a single-path scene, in accordance with an embodiment of the present disclosure. It can be seen that, the solution in the embodiment can still significantly reduce ISI, which is resulted from intrinsic interference of FBMC/OQAM system. When the SNR is low, two solutions can have similar error performances. Accompanying with increasing of SNR, BER descent speed of the comparative object is reduced gradually, and an error floor occurs around 16 dB. However, by using the solution of the embodiment, even if in a scene with higher SNR, rapid BER descent speed is maintained. It is demonstrated that the solution can reduce, or even eliminate the error floor, and improve system link reliability.

Figure 16:
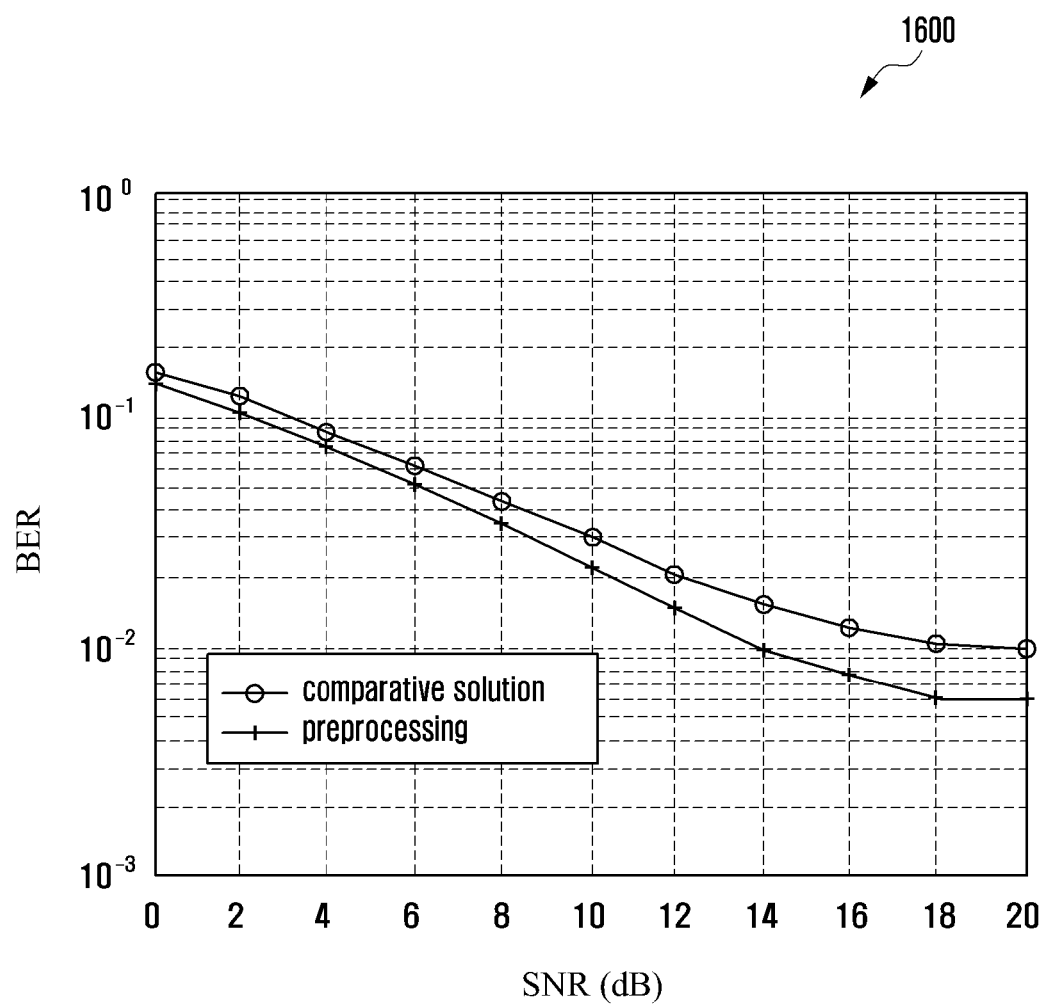
FIG. 16 is a schematic diagram illustrating BER comparisons in different solutions of an ETU channel high-speed scene in a multi-antenna system, in accordance with an embodiment of the present disclosure.

FIG. 16 is a schematic diagram 1600 illustrating BER comparisons in different solutions in the ETU channel, when receiver mobility speed is 300 km/h. Strong frequency selectivity of the ETU channel leads to further deterioration of system performance. However, by using the solution of the embodiment, occurrence of error floor is still effectively delayed, error floor is reduced, and link reliability can be unproved in a scene with a higher SNR.

A Fifth Embodiment

The embodiment provides a solution about dynamic preprocessing of transmitter, when channel changes. Since actual transmission environment changes, accompanying with changes of environment, particularly in a high-speed mobility environment, channel fading also changes accompanying with significant location change. Thus, preprocessing performed to original DB by the transmitter should also change therewith. Specifically speaking, original DB size, resource allocation mode and data processing mode also change, accompanying with channel change. Besides, based on channel adaptive preprocessing mode, adaptability to actual scenes of the solution provided by the present disclosure can also be improved.

Figure 17:
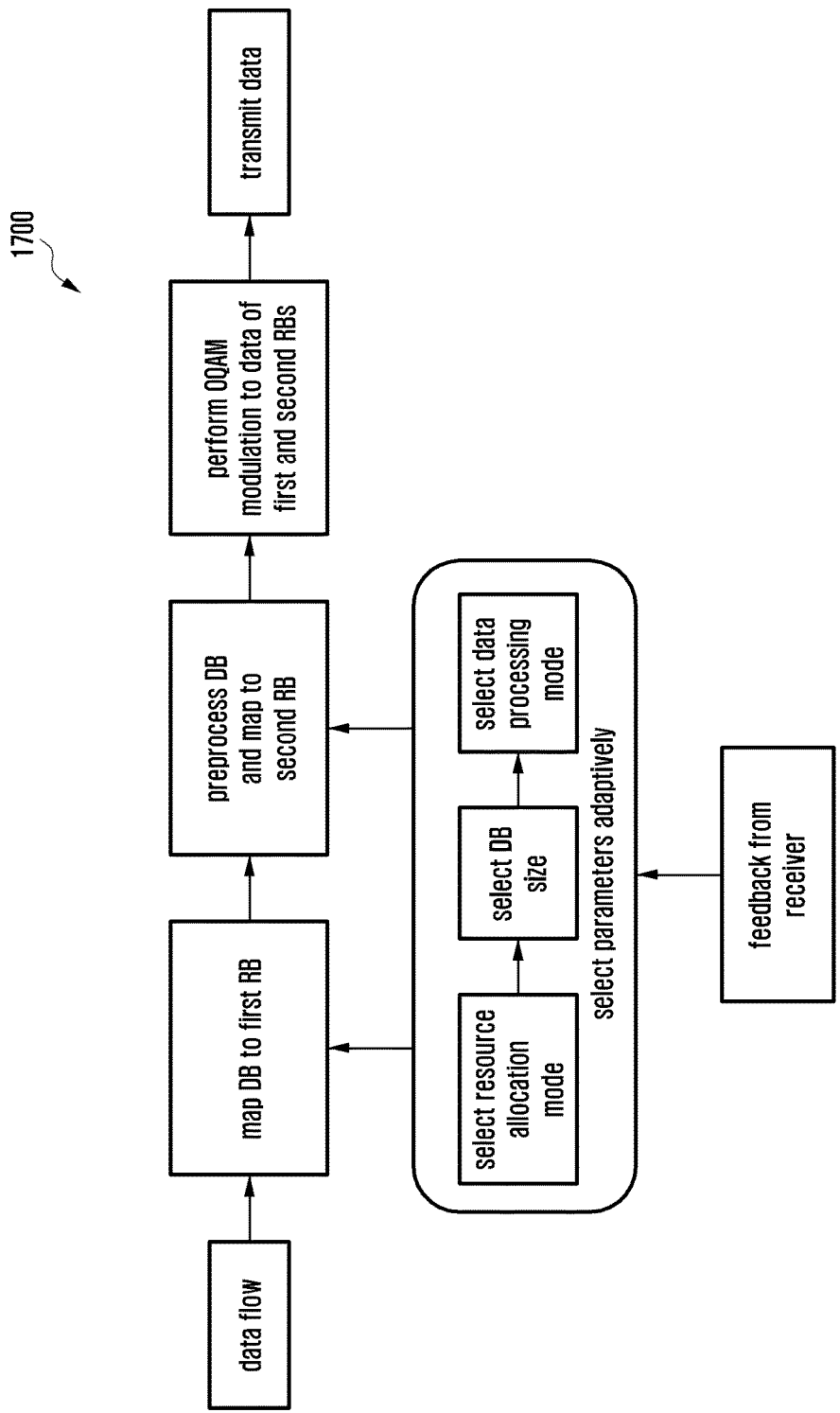
FIG. 17 is a block diagram illustrating preprocessing of an adaptive transmitter, in accordance with an embodiment of the present disclosure.
Figure 18:
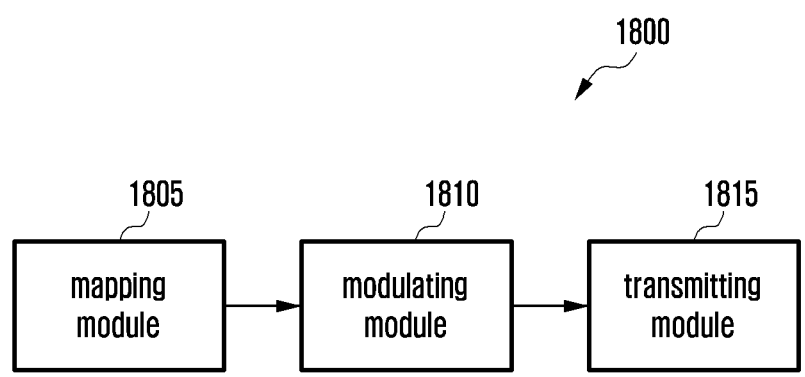
FIG. 18 is a schematic diagram illustrating structure of a transmitter, in accordance with an embodiment of the present disclosure.
Figure 19:
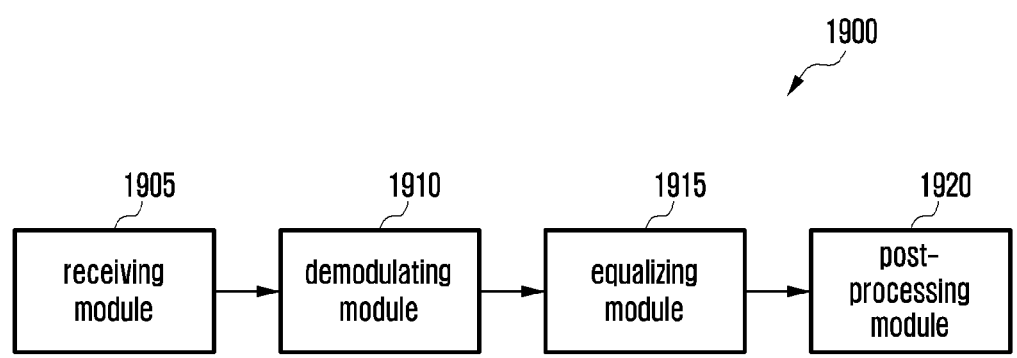
FIG. 19 is a schematic diagram illustrating structure of a receiver, in accordance with an embodiment of the present disclosure.

FIG. 17 is a flowchart 1700 illustrating an adaptive transmitter preprocessing, in accordance with an embodiment of the present disclosure.

Resource allocation mode and preprocessing mode are selected, by determining whether channel time selectivity is strong, or frequency selectivity is strong. Specifically speaking, when channel time selectivity is strong, ISI resulted from intrinsic interference is even worse, frequency domain repeated mode is selected to allocate resources, and a mode to take a conjugate for original DB is selected to execute preprocessing. When channel frequency selectivity is strong, ICI resulted from intrinsic interference is even worse, time domain repeated mode is selected to allocate resources, and another mode to take an opposite number of subcarrier symbols every other line is selected to execute preprocessing. When impacts on signals generated by the two kinds of fading are similar, for the FBMC/OQAM system, ISI resulted from the intrinsic interference is even worse, at this time, the frequency domain repeated mode is firstly selected to allocate resources, and the preprocessing is executed by combining two modes, that is, take an opposite number of subcarrier symbols every other line and take a conjugate.

In the present disclosure, whether the channel time selectivity is strong or weak is determined by time selective index value. The time selective index value is coherent time, Doppler shift extension, and so on. When the time selective index value meets a set first condition (e.g., when channel coherent time is less than a preset threshold, when channel Doppler shift extension is greater than a preset threshold, or a user mobility speed is greater than a preset threshold), determine that the time selectivity is strong. Whether the channel frequency selectivity is strong or weak is determined by frequency selective index value. The frequency selective index value uses coherent bandwidth, delay extensions, and so on. When the frequency selectivity index value meets a set second condition (e.g., when channel coherent bandwidth is less than a preset threshold, or channel delay extension is greater than a preset threshold), determine that frequency selectivity is strong. When the time selective index value and the frequency selective index value respectively meet a corresponding condition, firstly allocate the time frequency resources in the frequency domain.

DB size is selected based on channel change speed. Specifically speaking, when channel change speed is faster, smaller DB is used. When channel change speed is lower, larger DB is used. A preferred mode for selecting the size of the original DB can be as follows. Classify the channel change speeds into different groups. Each group corresponds to a size of an original DB. And make a look-up table based on such corresponding relationship. Select an appropriate size of an original DB from the look-up table, based on an actual channel change speed. Since the channel change speed is directly related with strength of channel time selectivity or channel frequency selectivity, the channel change speed is measured by using the channel time selective index or the channel frequency selective index.

In addition to the channel change speed, the DB size is also determined by a size of a data symbol block to be transmitted. That is, adjust the size of the repeated DB (that is, the original DB) based on the size of the data symbol block to be transmitted, such that the size of the data symbol block to be transmitted is an integer multiple of the size of the repeated DB (that is, the original DB).

In an actual system, the receiver estimates the time selectivity and the frequency selectivity based on a reference signal received from the transmitter, and feeds back a corresponding index value. The transmitter determines the resource allocation mode, the mapping order of preprocessed DBs and DB size based on the channel selective index fed back by the receiver. The specific blocks are as follows. The transmitter selects the resource allocation mode based on the channel selective index. When selecting to allocate resources repeatedly in a frequency domain, continuously monitor the channel frequency selectivity, select the employed DB size and whether to employ an inverse order of mapping based on the strength of the frequency selectivity. When selecting to allocate resources repeatedly in a time domain, continuously monitor the channel time selectivity, select the employed DB size and whether to employ an inverse order of mapping based on the strength of the time selectivity.

In addition to selecting the resource allocation mode, the DB size and the mapping order by using feedback, the receiver can also select an appropriate resource allocation mode, the DB size and the mapping order based on the channel estimation result, and feed back the selected resource allocation mode, the DB size and the mapping order. The feedback can be implemented after searching a look-up table, that is, only the index is fed back. And then, the transmitter can learn the preprocessing mode by using the index. When using the mode of searching a look-up table, respectively make a look-up table for the resource allocation mode, the DB size and the mapping order, and feed back three indexes. Alternatively, make one look-up table by synthesizing each mode, and feed back one index.

After determining the preprocessing mode, the transmitter informs the receiver about the preprocessing mode by using a downlink control channel or a downlink shared channel. When using the downlink control channel to inform the receiver about the preprocessing mode, insert a new field indicator in downlink control information. The new field indicator is used to indicate the resource allocation mode, the DB size and the mapping order. The new field indicator can be the resource allocation mode indicator, the DB size indicator and the mapping order indicator. The foregoing indication employs a mode of searching a look-up table. That is, the transmitter transmits an index to the receiver. The receiver determines the preprocessing mode by searching a look-up table with the index. When employing the mode of searching a look-up table, respectively make a look-up table for the resource allocation mode, the DB size and the mapping order, and transmit three indexes. Alternatively, make one look-up table by synthesizing each mode, and transmit one index. In addition to the downlink control channel, a corresponding field can also be transmitted in the downlink shared channel.

Corresponding to the foregoing method, the present disclosure provides a transmitter. Transmitter structure 1800 is referred to FIG. 18. The transmitter includes a mapping module 1805, a modulating module 1810 and a transmitting module 1815.

The mapping module is to map an original DB including at least one symbol to a first RB, preprocess the original DB, and map the preprocessed original DB to a second RB.

The modulating module is to modulate data of the first RB and the second RB, by using a FBMC modulation.

The transmitting module is to transmit the data modulated.

Corresponding to the foregoing method, the present disclosure provides a receiver. Receiver structure 1900 is shown in FIG. 10. The receiver includes a receiving module 1905, a demodulating module 1910, an equalizing module 1920 and a postprocessing module 1925.

The receiving module is to receive a DB.

The demodulating module is to demodulate the received DB, by using a FBMC-based demodulation mode.

The equalizing module is to equalize each demodulated symbol.

The postprocessing module is to perform a postprocessing to an equalized DB, based on a set DB size.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A filter bank multicarrier (FBMC) modulation-based signal transmitting method, the method comprising:
   mapping, by a transmitter, an original data block (DB) with at least one symbol to a first resource block (RB), preprocessing the original DB, and mapping the preprocessed original DB to a second RB;
   modulating, by the transmitter, data of the first RB and the second RB by using an FBMC modulation; and
   transmitting, by the transmitter, the data modulated.

2. The method according to claim 1, further comprising at least one of:

allocating, by the transmitter, same time resources for the first RB and the second RB, and allocating non-overlapped frequency resources with an equal number for the first RB and the second RB; or allocating, by the transmitter, same frequency resources for the first RB and the second RB, and allocating non-overlapped time resources with the equal number for the first RB and the second RB.

3. The method according to claim 1, further comprising:
dynamically selecting, by the transmitter, a resource allocation mode for allocating time frequency resources to the first RB and the second RB, based on channel state information fed back by a receiver; and
indicating the resource allocation mode to the receiver in a downlink control channel or a downlink shared channel, wherein indicating the resource allocation mode to the receiver comprises transmitting an index of the resource allocation mode in the downlink control channel or the downlink shared channel, so as to facilitate the receiver to obtain the resource allocation mode after searching in a look-up table with the index of the resource allocation mode.

4. The method according to claim 1, further comprising:
dynamically adjusting, by the transmitter, a size of the original DB and a mapping order of preprocessed DBs based on channel state information fed back by a receiver; and
informing the receiver a size of a DB to be processed currently and the mapping order by using a downlink control channel or a downlink shared channel,
wherein informing the receiver the size of the DB to be processed currently and the mapping order by using the downlink control channel or the downlink shared channel comprises transmitting a DB size indicator and a mapping order indicator, so as to facilitate the receiver to obtain the DB size and the mapping order of preprocessed DBs, after searching in a look-up table with the DB size indicator and the mapping order indicator.

5. The method according to claim 1, further comprising:
receiving from the receiver, by the transmitter, an index of a resource allocation mode, a DB size index and a mapping order index, which are determined by the receiver based on a channel estimation result, determining the resource allocation mode, a DB size and a mapping order by searching a look-up table, wherein searching in the look-up table comprises at least one of:
   the resource allocation mode, the DB size and the mapping order respectively corresponding to the look-up table, and respectively possessing a corresponding index; or
   the resource allocation mode, the DB size and the mapping order corresponding to one look-up table.

6. The method according to claim 2, further comprising:
when a channel time selective index value meets a set first condition, selecting, by the transmitter, to allocate time frequency resources in a frequency domain;
when a channel frequency selective index value meets a set second condition, selecting, by the transmitter, to allocate the time frequency resources in a time domain; and
when the channel time selective index value meets the set first condition and the channel frequency selective index value meets the set second condition, selecting, by the transmitter, to allocate the time frequency resources in the frequency domain.

7. The method according to claim 1, wherein preprocessing the original DB and mapping the preprocessed original DB to the second RB comprises at least one of:
   mapping the preprocessed DB to the second RB in sequence; or
   mapping the preprocessed DB to the second RB in a reverse sequence,
   wherein preprocessing the original DB comprises at least one of:
      performing a conjugate to each symbol in the original DB,
      performing the conjugate to each symbol in the original DB, and taking an opposite number of a symbol of an even subcarrier or an odd subcarrier,
      taking an opposite number of a symbol of an even subcarrier, or an odd subcarrier in the original DB, and performing the conjugate to each symbol,
      taking an opposite number of a symbol of an even subcarrier, or an odd subcarrier in the original DB, and
      taking an opposite number of a symbol of an even or odd offset quadrature amplitude modulation (OQAM) symbol in the original DB.

8. The method according to claim 4, wherein dynamically adjusting the size of the original DB comprises:
   classifying channel change speeds into different groups, wherein each group corresponds to the size of the original DB; and
   obtaining the DB size by using a corresponding index, based on a channel change speed,
   wherein dynamically adjusting the mapping order of the preprocessed DBs comprises:
      when the channel change speed is greater than a set first threshold, preprocessing the DBs based on the mapping order, and
      when the channel change speed is less than a set second threshold, preprocessing the DBs based on an inverted mapping order, and
   wherein the channel change speed comprises a frequency domain change speed and a time change speed, the frequency domain change speed is measured by a channel frequency selective index, the time change speed is measured by a channel time selective index, the channel frequency selective index and the channel time selective index are determined by the receiver based on a channel estimation result.

9. The method according to claim 4, wherein dynamically adjusting the size of the original DB comprises adjusting the size of the original DB based on a size of a data symbol block to be transmitted, such that the size of the data symbol block to be transmitted is an integer multiple of the size of the original DB.

10. The method according to claim 3, wherein determining the resource allocation mode, a size of the original DB, and a mapping order comprises:
    determining the resource allocation mode based on channel time selective fading and channel frequency selective fading;
    when selecting to allocate time frequency resources in a frequency domain, determining the size of the original DB and the mapping order based on the channel frequency selective fading; and
    when selecting to allocate the time frequency resources in a time domain, determining the size of the original DB and the mapping order based on the channel time selective fading.

11. A transmitter, comprising:
    at least one processor configured to:
       map an original data block (DB) with at least one symbol to a first resource block (RB), preprocess the original DB, and map the preprocessed original DB to a second RB;
       modulate data of the first RB and the second RB, by using a filter bank multicarrier (FBMC) modulation; and
       transmit the data modulated.

12. A filter bank multicarrier (FBMC) modulation-based signal receiving method, the method comprising:
    receiving, by a receiver, a data block (DB); demodulating, by the receiver, the DB received, by using an FBMC modulation mode;
    equalizing, by the receiver, the demodulated DB; and
    performing, by the receiver, a combination process to a symbol of a first resource block (RB) in the equalized DB and a symbol of a second RB in the equalized DB based on a set DB size.

13. The method according to claim 12, wherein the first RB and the second RB are resources in a group of time frequency resources.

14. The method according to claim 12, wherein the combination process comprises performing an arithmetic average to the symbol of the first RB and the symbol of the second RB.

15. The method according to claim 12, wherein the combination process comprises performing an arithmetic average to the symbol of the first RB and an opposite number of the symbol of the second RB.

16. The method according to claim 14, wherein the combination process comprises:
    swapping a real part and an imaginary part of the symbol of the second RB; and
    performing the arithmetic average to the symbol of the first RB and the symbol of the second RB.

17. The method according to claim 14, wherein the combination process comprises:
    swapping a real part and an imaginary part of the symbol of the second RB; and
    performing the arithmetic average to the symbol of the first RB and an opposite number of the symbol of the second RB.

18. The method according to claim 12, further comprising:
    determining, by the receiver, a channel frequency selective index and a channel time selective index based on a channel estimation result, and feeding back the channel frequency selective index and the channel time selective index to a transmitter; and
    determining, by the receiver, a resource allocation mode, the DB size and a mapping order based on the channel estimation result, and feeding back a respective index of the resource allocation mode, the DB size and the mapping order to the transmitter.

19. The method according to claim 12, further comprising at least one of:
    determining, by the receiver, a channel frequency selective index and a channel time selective index based on a channel estimation result, and feeding back the channel frequency selective index and the channel time selective index to a transmitter; or
    determining, by the receiver, a resource allocation mode, the DB size and a mapping order based on the channel estimation result, and feeding back a respective index of the resource allocation mode, the DB size and the mapping order to the transmitter.

20. A receiver, comprising:
at least one processor configured to:
  receive a data block (DB);
  demodulate the DB received, by using a filter bank multicarrier (FBMC) demodulation mode;
  equalize the demodulated DB; and
  perform a combination process to a symbol of a first resource block (RB) in the equalized DB and a symbol of a second RB in the equalized DB based on a set DB size.

* * * * *